(12) United States Patent
Sonobe et al.

(10) Patent No.: US 6,320,734 B1
(45) Date of Patent: Nov. 20, 2001

(54) COMMUNICATION DEVICE

(75) Inventors: Hideki Sonobe; Yasuo Iwahashi; Masayuki Watabe; Toshiaki Suzuki, all of Kawasaki; Hiroyuki Kiyanagi; Yasuhiro Shibuya, both of Sendai, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/287,358

(22) Filed: Apr. 7, 1999

(30) Foreign Application Priority Data

Apr. 15, 1998 (JP) ................................. 10-105036

(51) Int. Cl.⁷ ..................................................... H02H 5/00
(52) U.S. Cl. .......................... 361/103; 361/115; 361/695
(58) Field of Search ................................... 361/103, 115, 361/93.1, 695

(56) References Cited

U.S. PATENT DOCUMENTS 5,544,012 * 8/1996 Koike ..................................... 361/695
5,963,873 * 10/1999 Suzuki ................................. 455/560

* cited by examiner

Primary Examiner—Stephen W. Jackson
(74) Attorney, Agent, or Firm—Rosenman & Colin, LLP

(57) ABSTRACT

A communication device includes a number of transmitter/receiver/modem blocks installed in vertical positions. Each of the transmitter/receiver/modem blocks includes a supporting board having a front surface and a back surface, the supporting board including a plurality of fins on the front surface and a plurality of forced air-cooling fans on the supporting board. A front cover encloses the front surface of the supporting board, the front cover and the fins forming a plurality of ducts, the front cover and the front surface forming an internal opening under the fins. A back cover encloses the back surface of the supporting board. First heat-radiating circuit modules are provided at positions adjacent to the fins on the front surface. A second heat-radiating circuit module is provided within the opening. When the forced air-cooling fans operate, the fans produce a flow of air along the plurality of ducts to cool the first heat-radiating circuit modules, and the fans producing a flow of air within the opening to cool the second heat-radiating circuit board.

8 Claims, 17 Drawing Sheets

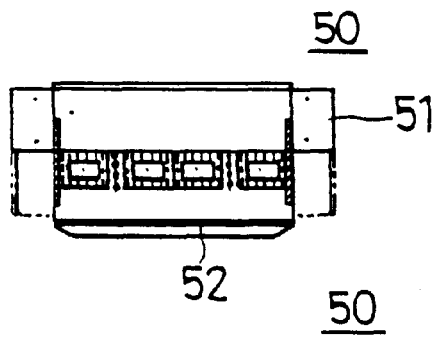
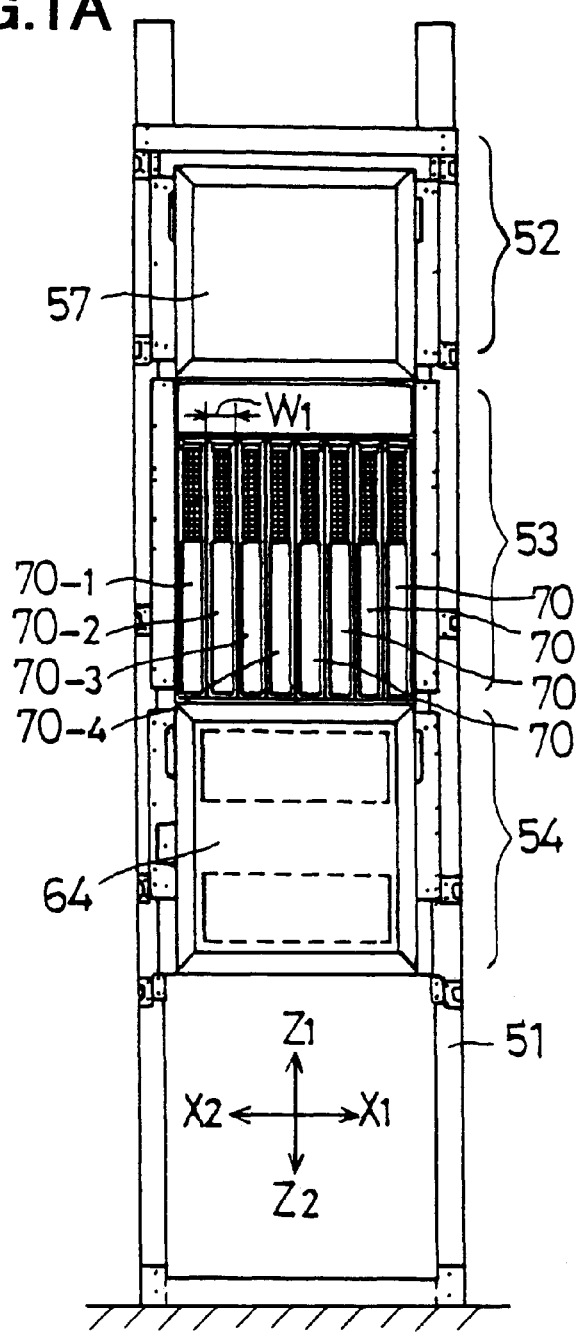
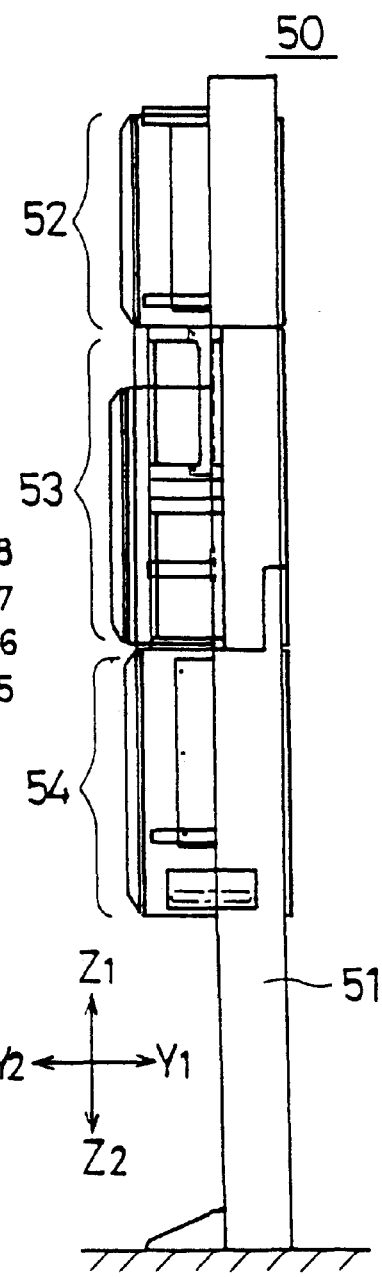

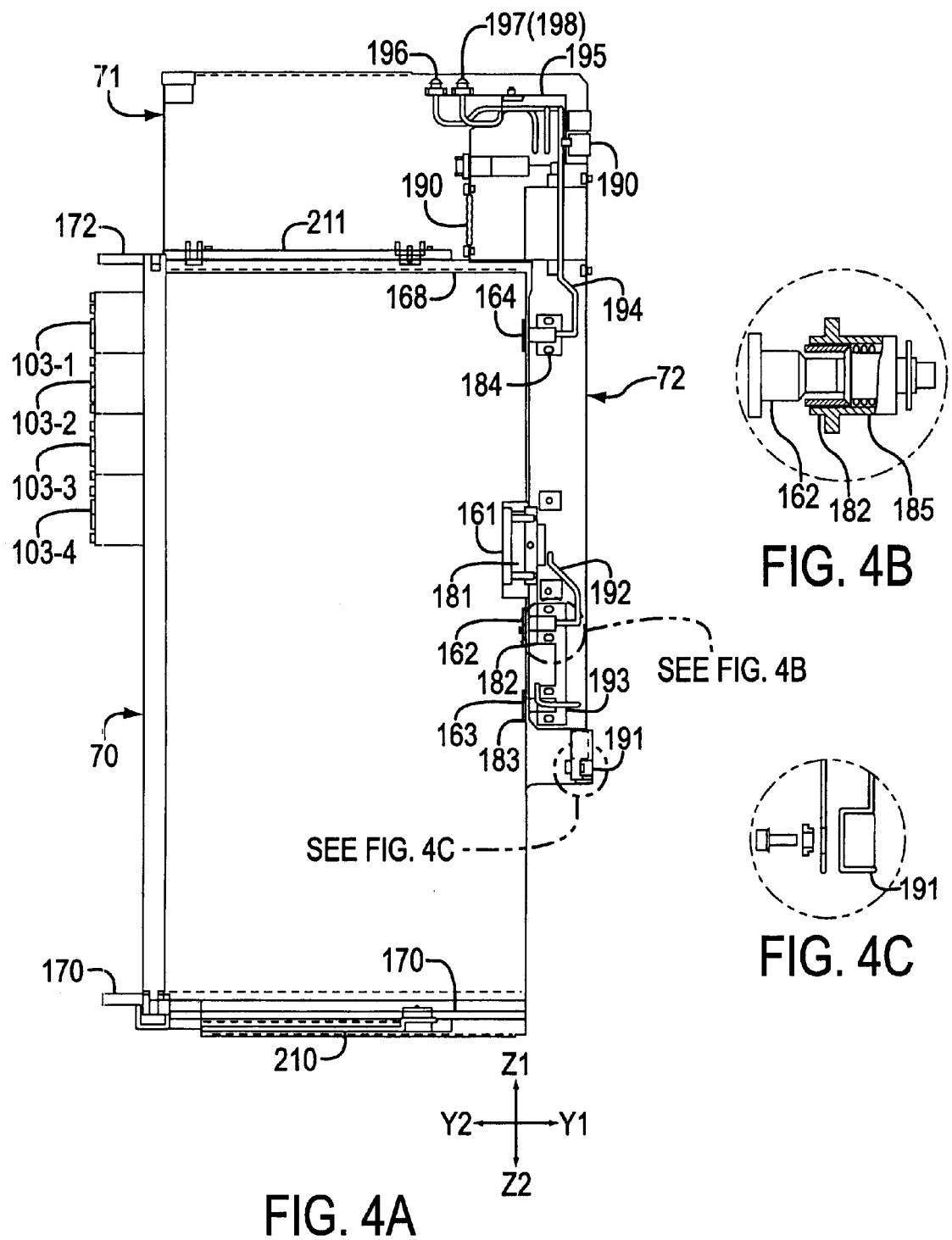

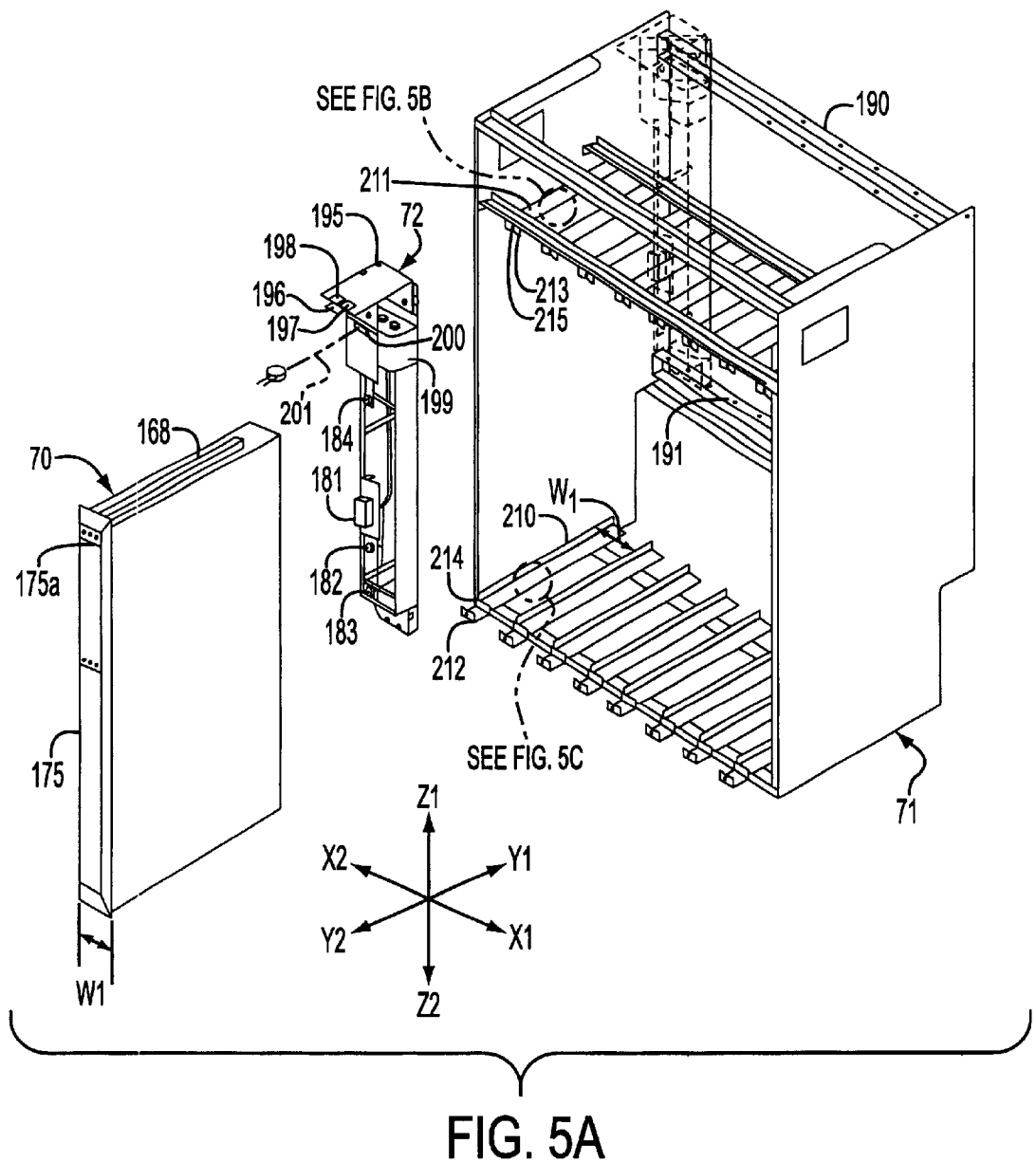
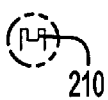
FIG. 5A
FIG. 5B          FIG. 5C

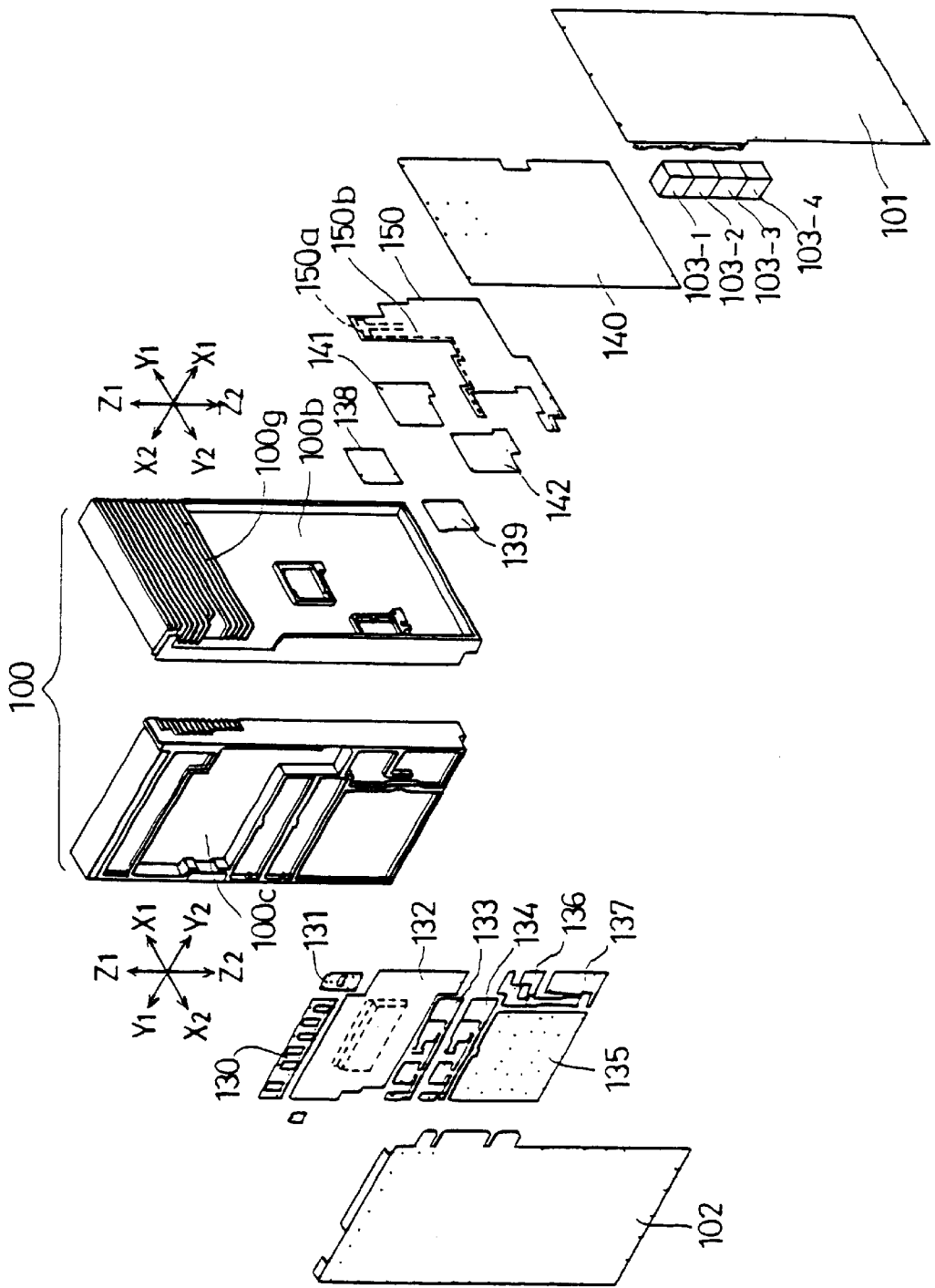

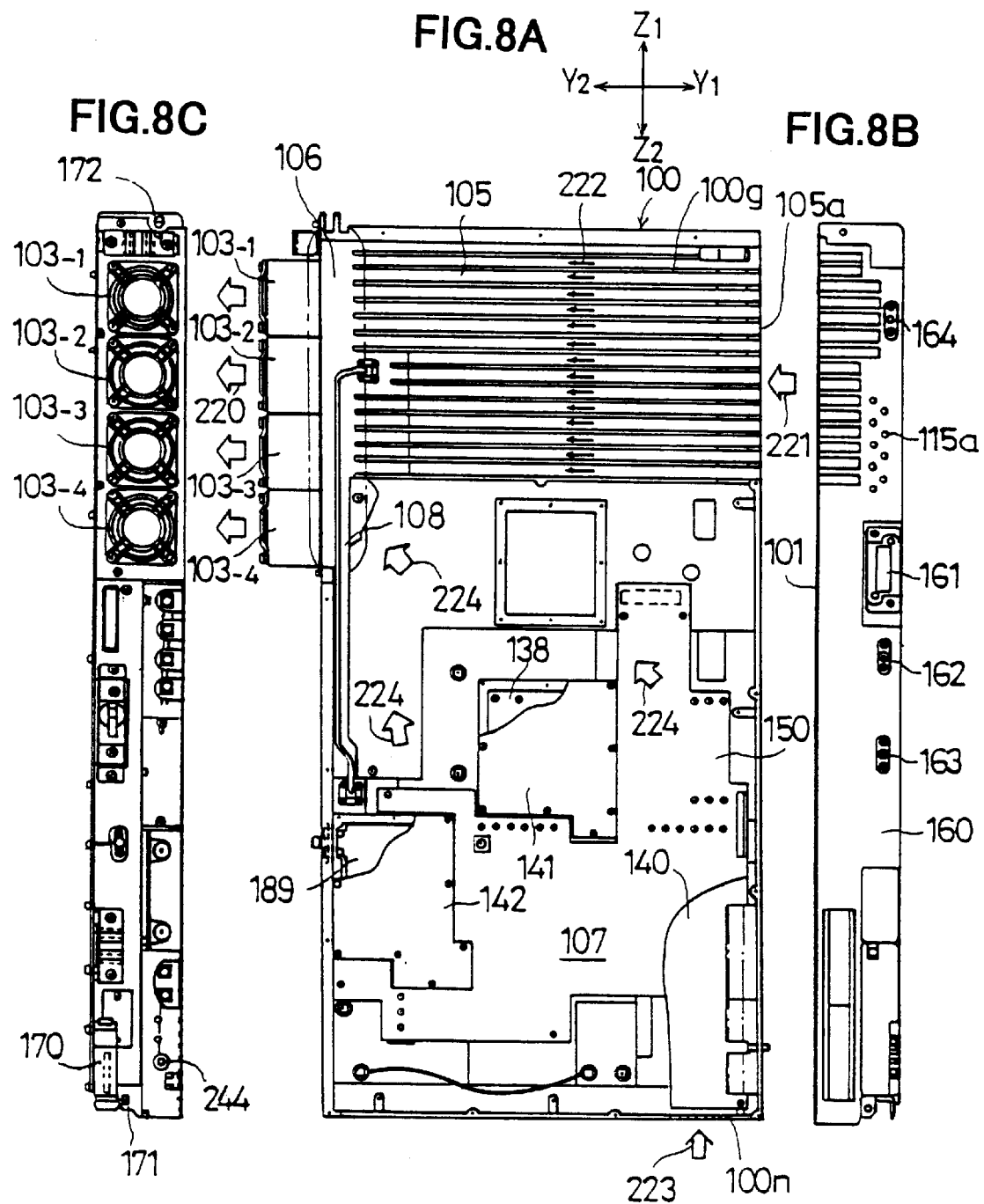

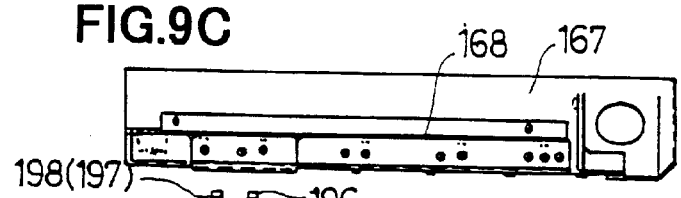
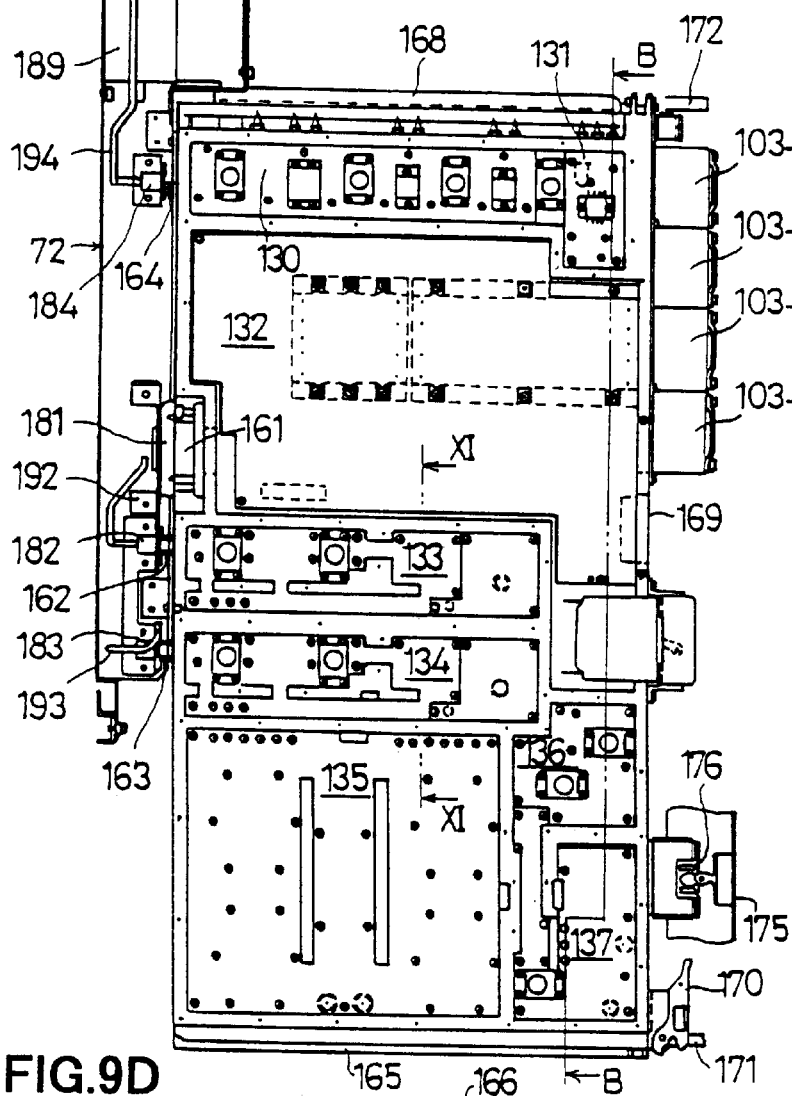
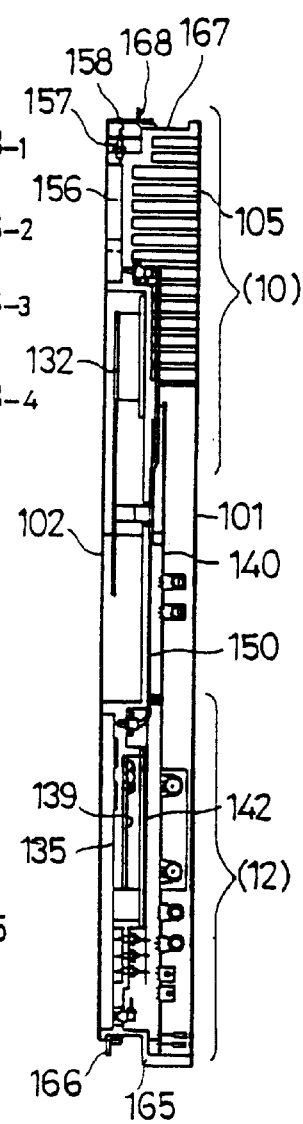
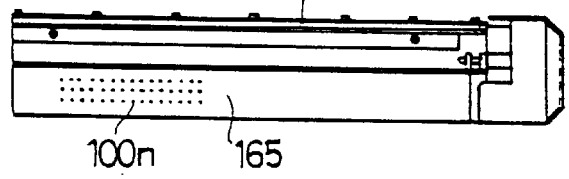

FIG.14B
FIG.14A
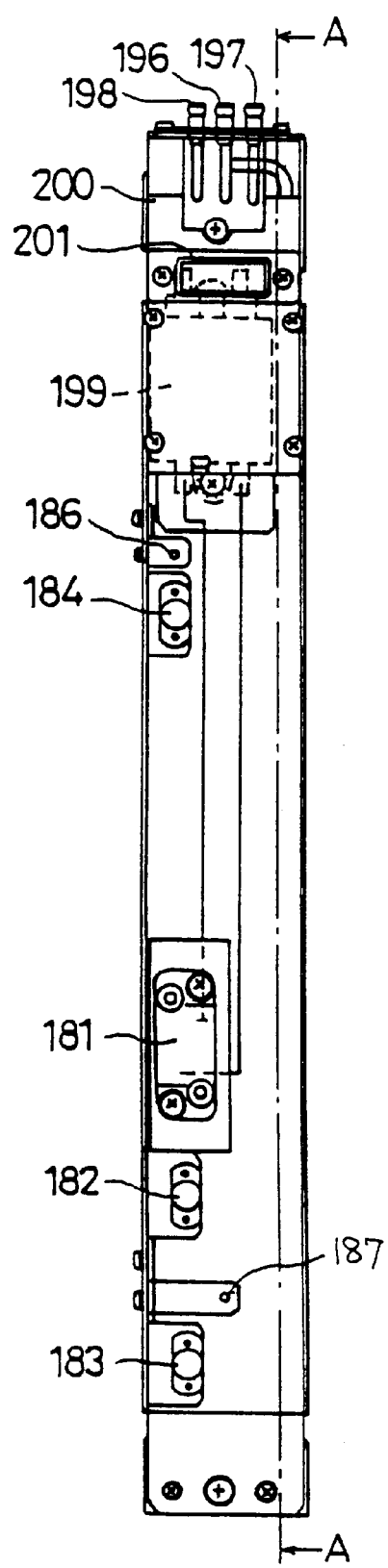
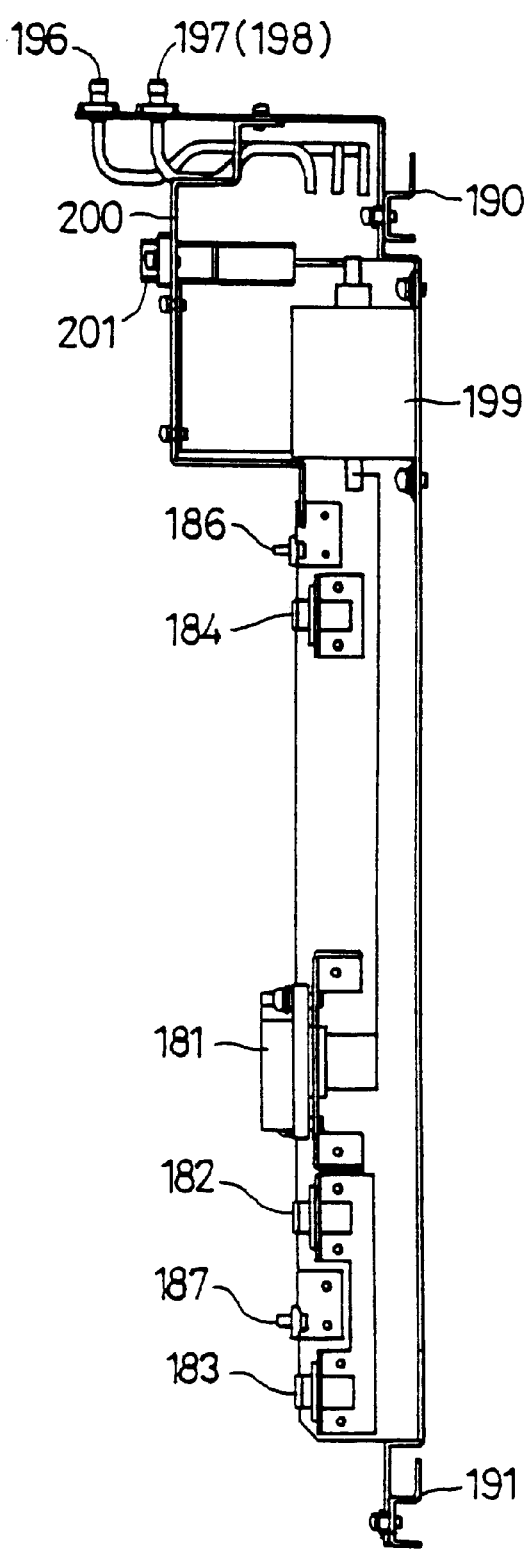

COMMUNICATION DEVICE

BACKGROUND OF THE INVENTION (1) Field of the Invention

The present invention generally relates to communication devices, and more particularly to a digital multiplex radio communication device which transmits and receives an STM (synchronous transfer mode) multiplex radio signal over an SDH (synchronous digital hierarchy) network. The digital multiplex radio communication device is linked to the SDH network by plural working channel lines and a protection channel line.

(2) Description of the Related Art

The framework and specifications of the synchronous digital hierarchy (SDH) network interface have been provided by the ITU-T (International Telecommunication Union- Telecommunication Standardization Sector). Recently, attention is being given to the use of the SDH (synchronous digital hierarchy) network for public switched communication networks.

FIG. 17 shows a conventional digital multiplex radio communication device 10. This communication device 10 is installed in, for example, an in-house space of a base-station site. The conventional digital multiplex radio communication device 10 transmits and receives an STM-based multiplex radio signal over an SDH network, and it is linked to the network by "N" channel lines, the "N" channel lines including "N–1" working channel lines and a protection channel line (where N is an integer).

As shown in FIG. 17, the conventional digital multiplex radio communication device 10 generally has a frame 11, a common component 12, a transmitter component 13, a receiver component 14, a control component 15, a modulation/demodulation component 16, and a power supply component 17.

As shown in FIG. 17, the frame 11 includes a front surface and a back surface. The common component 12 is arranged at an upper portion of the back surface of the frame 11. The transmitter component 13, the receiver component 14, the control component 15, the modulation/demodulation component 16, and the power supply component 17 are arranged, in this order, on the front surface of the frame 11 in a vertical downward direction of the communication device 10.

The common component 12 includes a plurality of filters 20, and the filters 20 are arranged in a horizontal left-to-right direction of the communication device 10. Each of the filters 20 has an output connected to an antenna (not shown).

A shelf 27 having a plurality of shelf stages is attached to the frame 11. The transmitter component 13 includes a number of transmitter boards 21, corresponding to the "N" channel lines, and the transmitter boards 21 are arranged in the uppermost shelf stage of the shelf 27 in the horizontal left-to-right direction of the device 10. Similarly, the receiver component 14 includes a number of receiver boards 22, corresponding to the "N" channel lines, and the receiver boards 22 are arranged in one of the shelf stages of the shelf 27 in the horizontal left-to-right direction of the device 10. The control component 15 includes a number of control boards 23, corresponding to the "N" channel lines, and the control boards 23 are arranged in one of the shelf stages of the shelf 27 in the horizontal left-to-right direction of the device 10. The modulation/demodulation component 16 includes a number of modulation boards 24 and a number of the demodulation boards 25, both corresponding to the "N" channel lines, and the modulation and demodulation boards 24 and 25 are arranged in one of the shelf stages of the shelf 27 in the horizontal left-to-right direction of the device 10. The power supply component 17 includes a number of power supply boards 26, corresponding to the "N" channel lines, and the power supply boards 26 are arranged in the lowermost shelf stage of the shelf 27 in the horizontal left-to-right direction of the device 10.

In the communication device 10 of FIG. 17, a group of the transmitter board 21, the receiver board 22, the control board 23, the modulation board 24, the demodulation board 25 and the power supply board 26 is provided for every channel line. Since the communication device 10 is linked to the network by the "N" channel lines, it is necessary that the communication device 10 includes "N" groups of these elements.

Further, in the communication device 10 of FIG. 17, the transmitter board 21, the receiver board 22, the control board 23, the modulation board 24, the demodulation board 25 and the power supply board 26, included in each group, are interconnected by a cable or a wire back board (not shown). Further, a number of pipe cables 28, corresponding to the "N" channel lines, are provided to respectively connect the filters 20 of the common component 12 and the transmitter boards 21 of the transmitter component 13. A number of pipe cables 29, corresponding to the "N" channel lines, are provided to respectively connect the filters 20 of the common component 12 and the receiver boards 21 of the receiver component 14. Each of the pipe cables 28 is connected at one end to one of the transmitter boards 21 by using a nut, and connected at the other end to one of the filters 20. Each of the pipe cables 29 is connected at one end to one of the receiver boards 22, and connected at the other end to one of the filters 20.

The communication device 10 of FIG. 17 employs a natural air-cooling, and the transmitter boards 21, the receiver boards 22, the control boards 23, the modulation boards 24, the demodulation boards 25 and the power supply boards 26 are arranged in a somewhat scattering manner. The communication device 10 does not take any measure to effectively cool the heat-radiating boards in the frame, such as the power supply boards 26, during operation. It is difficult that only the natural air-cooling maintains the communication device 10 in a good heat-radiation condition during operation.

As the communication device 10 must include the "N" groups of the transmitter boards 21, the receiver boards 22, the control boards 23, the modulation boards 24, the demodulation boards 25 and the power supply boards 26 in order to install the base-station equipment for each of the "N" channel lines, and the communication device 10 requires a comparatively wide area of the in-house space of the site to install the base-station equipment for each of the "N" channel lines. However, in the case of the communication device 10, the capacity of the frame 11 to accommodate these boards is limited to the equipment for the four channel lines. For example, when the installation of the seven channel lines on the site of the user is needed for desired base-station equipment, it is necessary to install two digital multiplex radio communication devices 10 mentioned above. Hence, the cost of the base-station equipment in such a case becomes high, which may cause the user to face a difficulty in installing the desired base-station equipment.

Moreover, in the communication device 10 of FIG. 17, the "N" groups of the transmitter boards 21, the receiver boards 22, the control boards 23, the modulation boards 24, the demodulation boards 25 and the power supply boards 26 are arranged in the scattering manner. When a malfunction in the communication device 10 occurs, it is necessary to disassemble the communication device 10 into various boards, in order to find out a defective board in the communication device 10, replace it with a new board, and confirm that the communication device 10 regains a normal operation by the replacement. Before the transmitter boards 21 and the receiver boards 22 are removed from the shelf 27, it is necessary to loosen the nuts by using a tool and disconnect the pipe cables 28 and 29 from the transmitter boards 21 and the receiver boards 22. Hence, the communication device 10 requires much expense in time and effort to recover the communication device 10 from the malfunction.

SUMMARY OF THE INVENTION

An object of the present invention is to provide an improved communication device in which the above-mentioned problems are eliminated.

Another object of the present invention is to provide a communication device which is able to effectively cool the heat-radiating boards, such as the power supply boards, in the frame of the communication device during operation, while requiring only a narrow installation space on the site of the user.

Still another object of the present invention is to provide a communication device which requires only a simple recovery procedure if a malfunction in the communication device occurs, while minimizing the expense in time and effort to recover the communication device from the malfunction.

A further object of the present invention is to provide a communication device which is able to avoid discontinuation of communications over the network if a serious malfunction in the communication device occurs, while providing a notification of the malfunction to the user.

The above-mentioned objects of the present invention are achieved by a communication device in which a number of transmitter/receiver/modem blocks are installed in vertical positions, each of the transmitter/receiver/modem blocks including: a supporting board which has a front surface and a back surface, the supporting board including a plurality of fins on the front surface and a plurality of forced air-cooling fans on the supporting board; a front cover which encloses the front surface of the supporting board, the front cover and the fins forming a plurality of ducts, the front cover and the front surface forming an internal opening under the fins; a back cover which encloses the back surface of the supporting board; first heat-radiating circuit modules which are provided between the back cover and the back surface at positions adjacent to the fins on the front surface; and a second heat-radiating circuit module which is provided within the opening formed by the front cover and the front surface, wherein, when the forced air-cooling fans operate, the fans produce a flow of air along the plurality of ducts to cool the first heat-radiating circuit modules, and the fans producing a flow of air within the opening to cool the second heat-radiating circuit board.

The above-mentioned objects of the present invention are achieved by a communication device in which a number of transmitter/receiver/modem blocks are installed in vertical positions, the communication device being linked to a network by a corresponding number of channel lines, each of the transmitter/receiver/modem blocks including: a supporting board which has a front surface and a back surface, the supporting board including a plurality of fins on the front surface and a plurality of forced air-cooling fans on the supporting board; a front cover which encloses the front surface of the supporting board, the front cover and the fins forming a plurality of ducts, the front cover and the front surface forming an internal opening under the fins; a back cover which encloses the back surface of the supporting board; a transmitter circuit module; a receiver circuit module; a heat-radiating amplification circuit module; a heat-radiating power supply circuit module; and a heat-radiating modem circuit module, wherein the transmitter circuit module, the receiver circuit module, the amplification circuit module, the power supply circuit module and the modem circuit module are connected together to allow communications over the network by using a corresponding one of the channel lines, both the amplification circuit module and the power supply circuit module provided between the back cover and the back surface at positions adjacent to the fins on the front surface; the modem circuit module provided within the opening formed by the front cover and the front surface; wherein, when the forced air-cooling fans operate, the fans produce a flow of air along the plurality of ducts to cool the amplification and power supply circuit modules, and the fans producing a flow of air within the opening to cool the modem circuit board.

The above-mentioned objects of the present invention are achieved by a communication device in which a number of transmitter/receiver/modem blocks are installed into a shelf in vertical positions, the communication device being linked to a network by a corresponding number of channel lines, each of the transmitter/receiver/modem blocks including: a supporting board which has a front surface and a back surface, a transmitter circuit module which is provided on one of the front surface and the back surface of the supporting board; a receiver circuit module which is provided on one of the front surface and the back surface of the supporting board; and a power supply circuit module which is provided on one of the front surface and the back surface of the supporting board, wherein the transmitter circuit module, the receiver circuit module, and the power supply circuit module are connected together to allow communications over the network by using a corresponding one of the channel lines, each of the transmitter/receiver/modem blocks being configured such that the transmitter/receiver/modem block can be freely inserted into or removed from the shelf, the transmitter/receiver/modem block including plug-in connector plugs at insertion ends of the transmitter circuit module and the receiver circuit module and a first power supply connector at an insertion end of the power supply circuit module, the shelf including plug-in connector receptacles at positions of the insertion ends of the transmitter circuit module and the receiver circuit module and a second power supply connector at a position corresponding to the insertion end of the power supply circuit module, wherein the plug-in connector plugs are fitted to the plug-in connector receptacles and the first power supply connector is fitted to the second power supply connector when the transmitter/receiver/modem block is inserted into the shelf.

The above-mentioned objects of the present invention are achieved by a communication device in which a number of transmitter/receiver/modem blocks are installed in vertical positions, the communication device being linked to a network by a corresponding number of channel lines, each of the transmitter/receiver/modem blocks including: a supporting board which has a front surface and a back surface, the supporting board including a plurality of forced air-cooling fans on the supporting board; a transmitter circuit module which is provided on one of the front surface and the back surface of the supporting board; a receiver circuit module which is provided on one of the front surface and the back surface of the supporting board; and a power supply circuit module which is provided on one of the front surface and the back surface of the supporting board; the transmitter circuit module, the receiver circuit module, and the power supply circuit module being connected together to allow communications over the network by using a corresponding one of the channel lines, the channel lines including a plurality of working channel lines and a protection channel line, the communication device comprising a control unit which starts an operation of one of the transmitter/receiver/modem blocks, provided for the protection channel line, when a malfunction of the fans of one of the transmitter/receiver/modem blocks, provided for the plurality of working channel lines, occurs.

In the communication device of a preferred embodiment of the present invention, the forced air cooling by the fans in each of the transmitter/receiver/modem blocks is effectively used in common for cooling the first heat-radiating circuit modules and for cooling the second heat-radiating circuit module. It is possible for the communication device of the present invention to effectively cool the first and second heat-radiating circuit boards in the frame of the communication device during operation. At the same time, the transmitter/receiver/modem blocks are installed into the shelf in vertical positions, and the communication device of the present invention requires only a narrow installation space on the site of the user.

The communication device of the preferred embodiment of the present invention uses the plug-in connectors to install the transmitter/receiver/modem blocks in the shelf, and installation of the blocks to or removal of the blocks from the shelf can be easily performed. It is not necessary to loosen the nuts by using a tool and disconnect the pipe cables from the transmitter/receiver/modem blocks before the transmitter/receiver/modem blocks are removed from the shelf as in the conventional communication device. The communication device of the present invention requires only a simple recovery procedure if a malfunction in the communication device occurs. At the same time, the communication device of the present invention is effective in minimizing the expense in time and effort to recover the communication device from the malfunction.

Further, in the communication device of the preferred embodiment of the present invention, the control unit starts the operation of the transmitter/receiver/modem block provided for the protection channel line, when a malfunction of the fans of one of the transmitter/receiver/modem blocks, provided for the plurality of working channel lines, occurs. It is possible for the communication device of the present invention to avoid discontinuation of communications over the network if a serious malfunction in the communication device occurs. At the same time, the communication device of a preferred embodiment of the present invention can provide a notification of the malfunction to the user.

BRIEF DESCRIPTION OF THE DRAWINGS

Other objects, features and advantages of the present invention will be more apparent from the following detailed description when read in conjunction with the accompanying drawings in which:

FIG. 1A, FIG. 1B and FIG. 1C are views of a digital multiplex radio communication device embodying the present invention;

FIG. 4 is a diagram for explaining a transmitter/receiver/modem component of the communication device;

FIG. 5 is an exploded perspective view of the transmitter/receiver/modem component of the communication device;

FIG. 6 is an exploded perspective view of a transmitter/receiver/modem block of the communication device;

FIG. 8A, FIG. 8B and FIG. 8C are diagrams for explaining the transmitter/receiver/modem block of the communication device;

FIG. 9A, FIG. 9B, FIG. 9C and FIG. 9D are diagrams for explaining the transmitter/receiver/modem block of the communication device;

FIG. 14A and FIG. 14B are diagrams for explaining an adapter of the communication device;

DETAILED DESCRIPTION OF THE PREFERRED EMBODIMENT

A description will be given of the preferred embodiment of the present invention with reference to the accompanying drawings.

Figure 2:
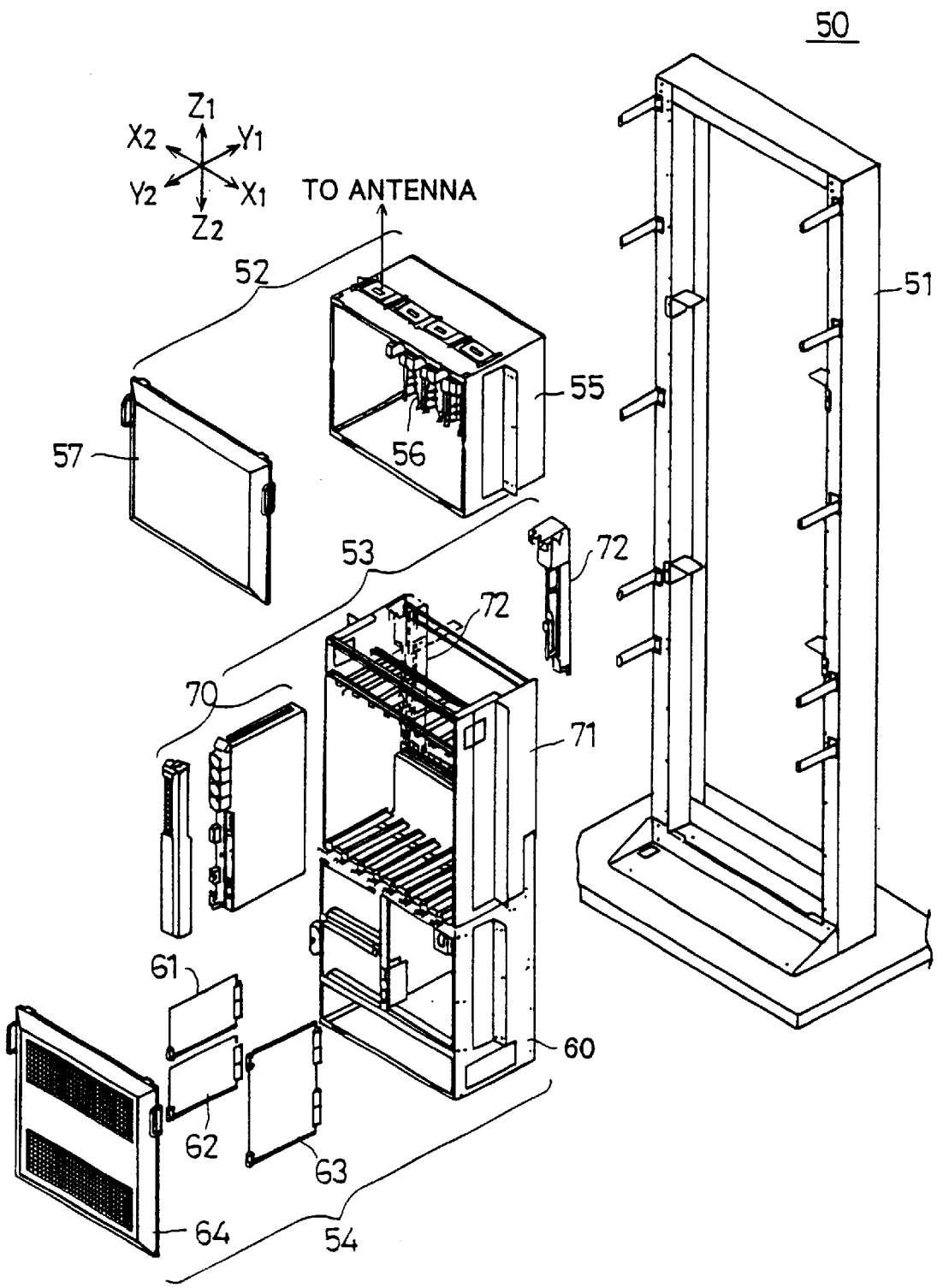
FIG. 2 is an exploded perspective view of the communication device of the present embodiment.

FIG. 1A, FIG. 1B and FIG. 1C are respectively a front view, a side view and a top view of a digital multiplex radio communication device 50 embodying the present invention. FIG. 2 is an exploded perspective view of the communication device 50 of the present embodiment.

This communication device 50 is installed in, for example, an in-house space of a base-station site. The digital multiplex radio communication device 50 transmits and receives an STM-based multiplex radio signal over an SDH network, and it is linked to the SDH network by "N" channel lines, the "N" channel lines including "N–1" working channel lines and a protection channel line (where N is an integer). Hereinafter, the digital multiplex radio communication device 50 of the present embodiment will be called the communication device 50.

As shown in FIG. 1A through FIG. 2, the communication device 50 generally has a frame 51, a common component 52, a transmitter/receiver/modem component 53, and a control component 54. The transmitter/receiver/modem component 53 will be also called an MSTU (main signal transmission unit) 53.

In the following drawings of FIG. 1A through FIG. 13B, vertical directions (up and down) of the communication device 50 are indicated by the arrows Z1 and Z2, horizontal directions (right and left) of the communication device 50 are indicated by the arrows X1 and X2, and horizontal directions (back and front) of the communication device 50 are indicated by the arrows Y1 and Y2.

In the communication device 50, the common component 52, the MSTU 53 and the control component 54 are arranged, in this order, on a front surface of the frame 51 in the vertical downward direction Z2 as shown in FIG. 2.

Figure 17:
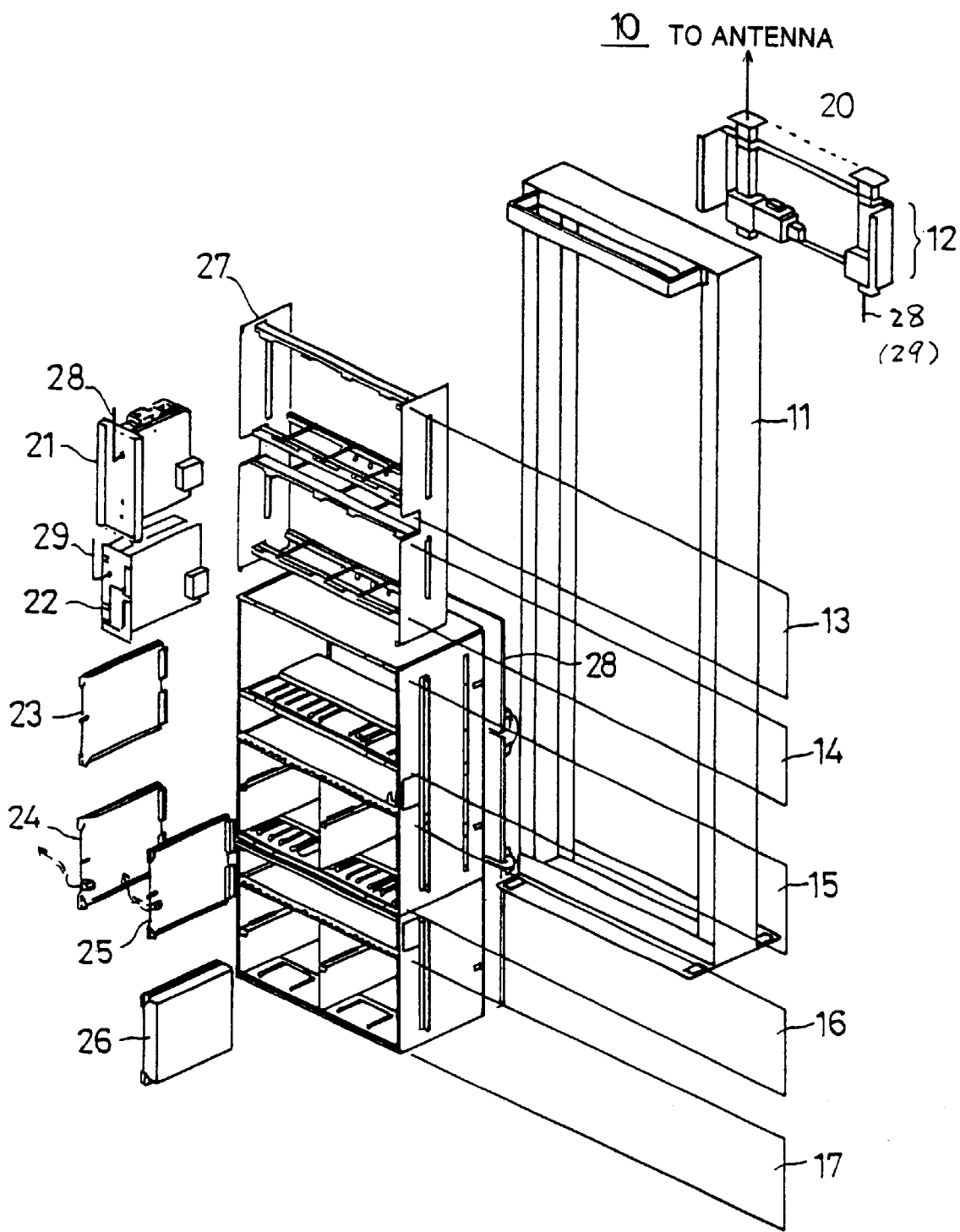
FIG. 17 is a diagram for explaining a conventional digital multiplex radio communication device.

In the present embodiment, the communication device 50 is linked to the network by eight channel lines, the channel lines including seven working channel lines and a single protection channel line. The capacity of the frame 51 to accommodate the equipment related to all the channel lines therein is twice as large as the capacity of the frame 11 of the conventional communication device 10 of FIG. 17 (which is limited to the equipment for the four channel lines). A major reason of this is that a number of transmitter/ receiver/ modem blocks 70 (constituting the MSTU 53), corresponding to the eight channel lines, are installed in vertical positions in the communication device 50, and each of the blocks 70 incorporates the transmitter board, the receiver board, the modulation board, the demodulation board and the power supply board (as in the conventional communication device 10) into a single unit. The transmitter/receiver/modem blocks 70 are indicated by reference numerals 70-1 through 70-8 indicated in FIG. 1A.

As shown in FIG. 2, the common component 52 includes a shelf 55, a number of filters 56 (corresponding to the eight channel lines), and a cover 57. The shelf 55 is attached to the frame 51. The filters 56 are installed into the shelf 55 in vertical positions. Each of the filters 56 has an output terminal connected to an antenna (not shown), and has an input terminal connected to one of a number of adapters 72 of the MSTU 53. The cover 57 closes a front opening of the shelf 55 so as to enclose the filters 56 in the shelf 55.

As shown in FIG. 2, the control component 54 includes a shelf 60, a first control board 61, a second control board 62, a third control board 63, and a cover 64. The shelf 60 is attached to the frame 51. The control boards 61, 62 and 63 are installed into the shelf 60 in vertical positions. A wire back board (not shown) is provided on a rear surface of the shelf 60, and the control boards 61, 62 and 63 are connected to the wire back board within the shelf 60. The cover 64 closes a front opening of the shelf 60 so as to enclose the control boards 61–63 in the shelf 60. The transmitter/receiver/modem blocks 70 of the MSTU 53 are connected to the control boards 61–63, and the control boards 61–63 control the transmitter/receiver/modem blocks 70, and monitor operations of the transmitter/receiver/modem blocks 70.

As shown in FIG. 2, the MSTU 53 includes a shelf 71, the number of adapters 72 (corresponding to the eight channel lines), and the number of transmitter/receiver/modem blocks 70 (corresponding to the eight channel lines). The shelf 71 has a front surface and a back surface. The adapters 72 are installed to the back surface of the shelf 71 in vertical positions. The adapters 72 are arranged side by side in the shelf 71 in the directions X1 and X2. The transmitter/ receiver/modem blocks 70 are installed to the front surface of the shelf 71 in vertical positions, and connected at their rear ends to the adapters 72 by using plug-in connectors. The transmitter/receiver/modem blocks 70 are arranged side by side in the shelf 71 in the directions X1 and X2. Each of the transmitter/receiver/modem blocks 70 provides transmission, receiving, modulation and demodulation functions with respect to one of the eight channel lines.

Figure 3:
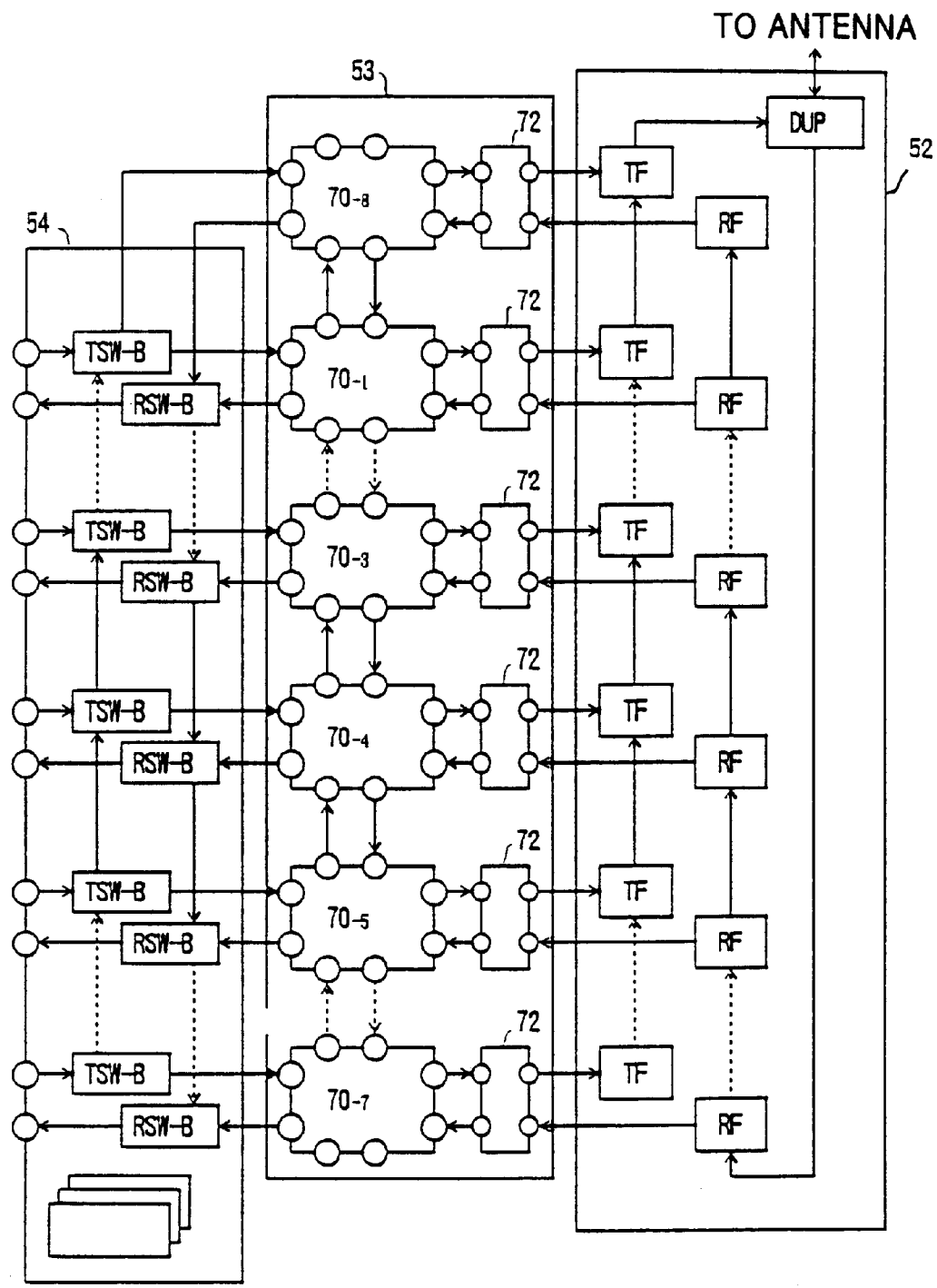
FIG. 3 is a diagram for explaining electrical connections of components of the communication device.

FIG. 3 is a diagram for explaining electrical connections of the components 52, 53 and 54 of the communication device 50. The transmitter/receiver/modem blocks of the transmitter/receiver/modem component 53 are indicated by the reference numerals 70-1 through 70-8 in FIG. 3. In particular, the transmitter/receiver/modem block provided for the protection channel line is indicated by the reference numeral 70-8 in FIG. 3.

As shown in FIG. 3, the common component 52 includes a duplexer (DUP) connected to the antenna. Each of the filters 56 of the common component 52 includes a transmitting signal filter element (TF) and a receiving signal filter element (RF), and the filter elements TF and RF are connected to the related transmitter/receiver/modem block 70 via the related adapter 72. The control component 54 includes a transmitting terminal switching unit (TSW-B) and a receiving terminal switching unit (RSW-B), which are both provided for each of the eight channel lines, and the switching units TSW-B and RSW-B are connected to the related transmitter/ receiver/modem block 70 of the MSTU 53.

FIG. 4 is a diagram for explaining the transmitter/ receiver/modem component 53 of the communication device 50. In the transmitter/receiver/modem component 53 of FIG. 4, the transmitter/receiver/modem block 70 and the adapter 72 are attached to the shelf 71. The transmitter/ receiver/modem block 70 and the adapter 72 are connected to each other by using plug-in connectors. The plug-in connectors will be described later.

FIG. 5 is an exploded perspective view of the transmitter/ receiver/modem component 53 of the communication device 50. In the transmitter/receiver/modem component 53 of FIG. 5, the transmitter/receiver/modem block 70 and the adapter 72 are removed from the shelf 71. The transmitter/ receiver/modem block 70 and the adapter 72 are disconnected from each other.

Figure 7:
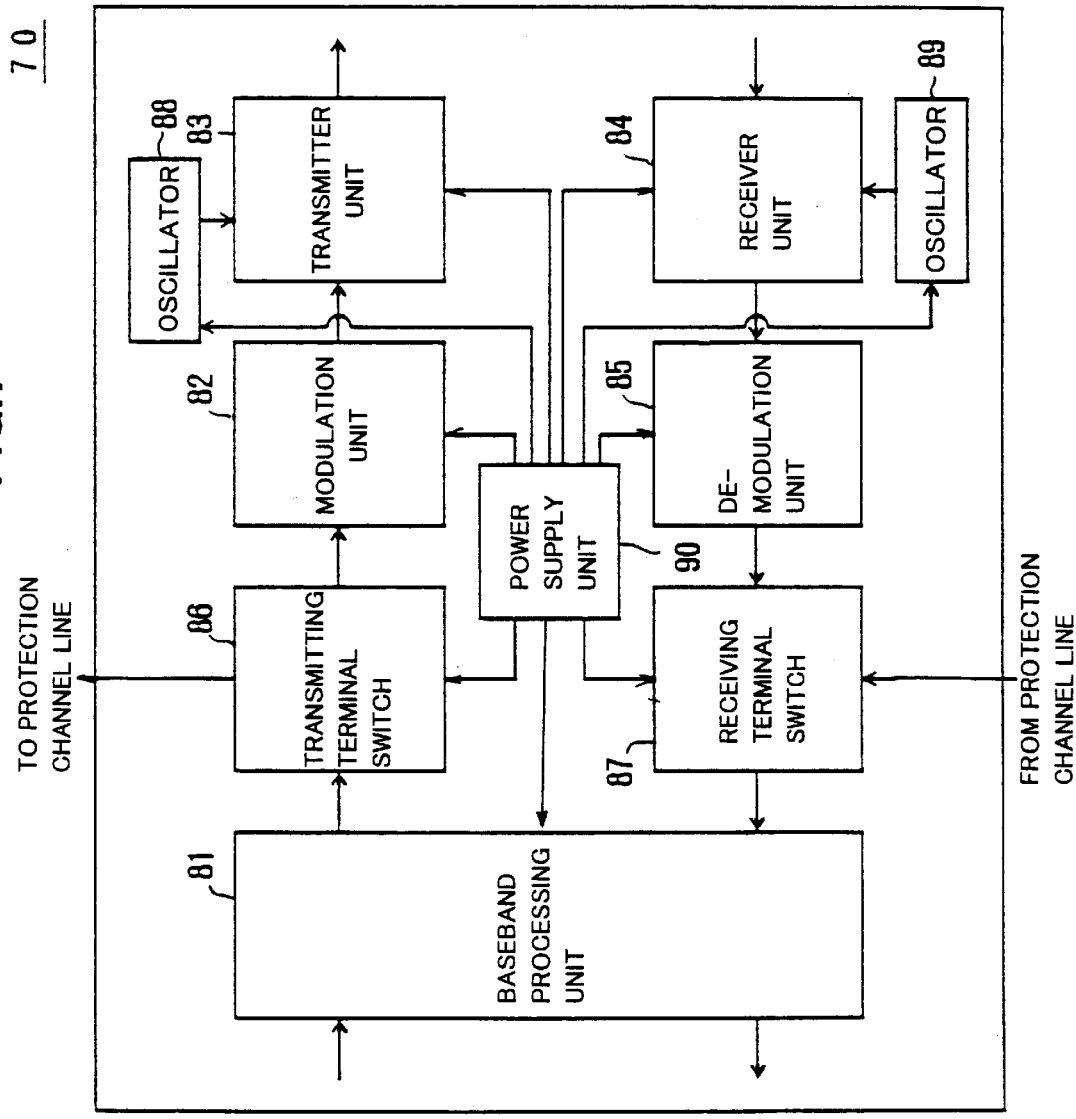
FIG. 7 is a block diagram of circuits of the transmitter/receiver/modem block of the communication device.

FIG. 6 is an exploded perspective view of the transmitter/ receiver/modem block 70 of the communication device 50. FIG. 7 is a block diagram of circuits of the transmitter/ receiver/modem block 70 of the communication device 50.

Hereinafter, a representative one of the transmitter/ receiver/modem blocks 70-1 through 70-8 in the communication device 50 of the present embodiment will be referred to as the block 70 for the sake of convenience.

As shown in FIG. 7, the block 70 includes a baseband processing unit 81, a modulation unit 82, a transmitter unit 83, a receiver unit 84, a demodulation unit 85, a transmitting terminal switch 86, a receiving terminal switch 87, a transmitting oscillator 88, a receiving oscillator 89, and a power supply unit 90. The transmitting terminal switch 86 and the receiving terminal switch 87 are provided for switching the block 70 (one of the elements 70-1 through 70-7) for the working channel line to the block 70 (the element 70-8) for the protection channel line when a receiving problem arises on the working channel line due to fading.

Figure 10A:
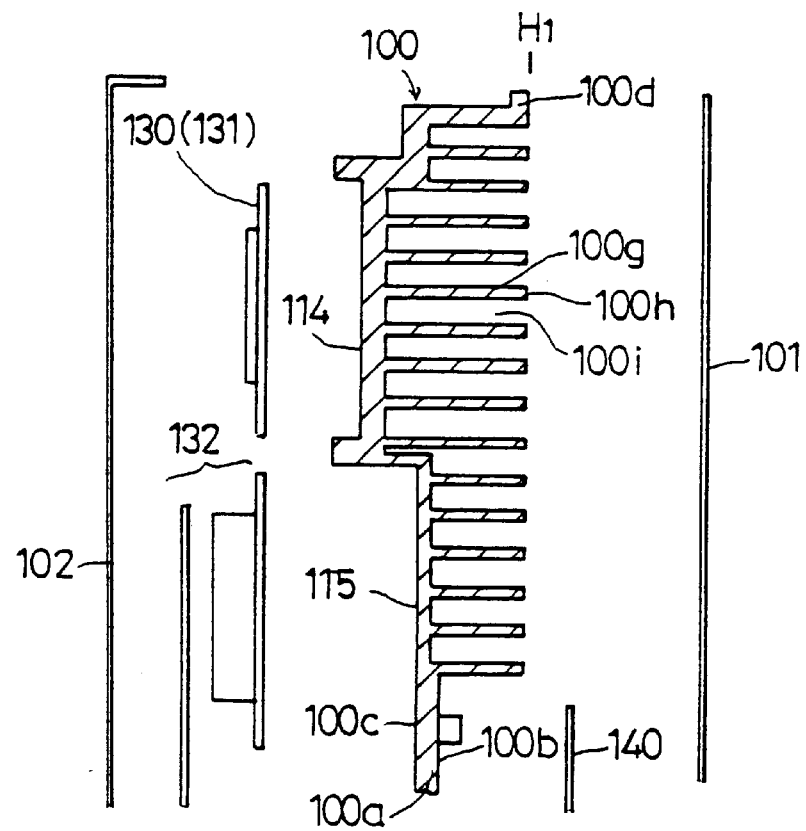
FIG. 10A and FIG. 10B are diagrams for explaining an essential portion of the transmitter/receiver/modem block indicated by a character A in FIG. 9B.
Figure 10B:
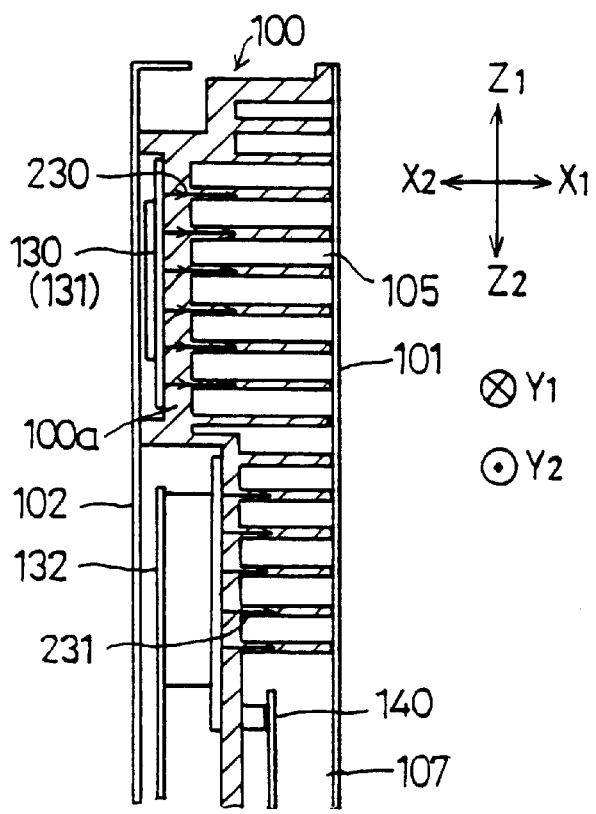
Figure 11A:
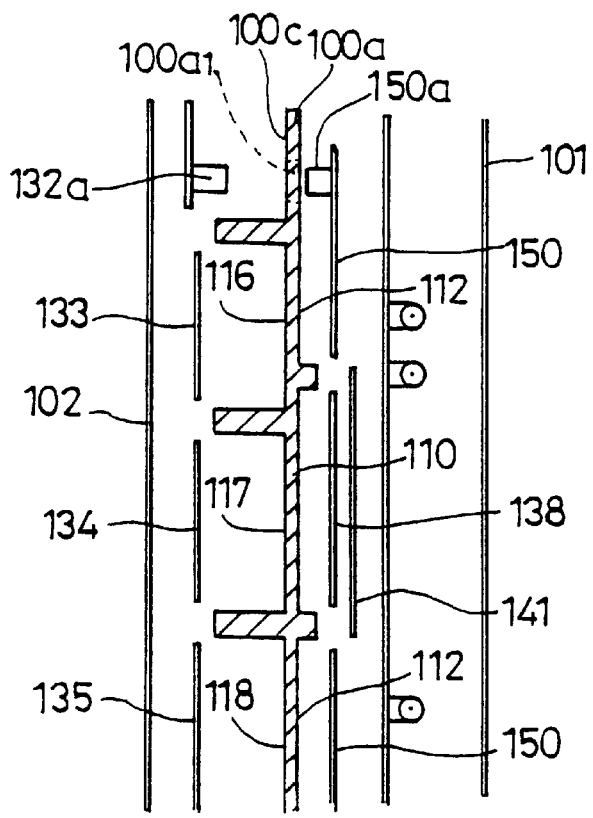
FIG. 11A and FIG. 11B are cross-sectional views of the transmitter/receiver/modem block taken along a line XI—XI indicated in FIG. 9A.
Figure 11B:
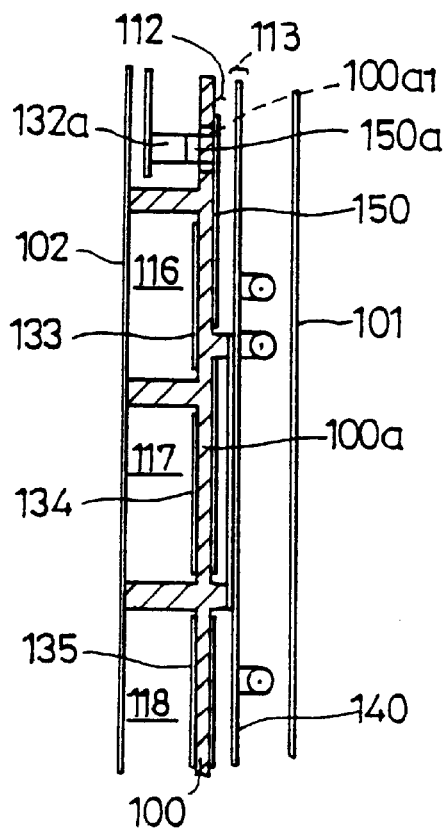
Figure 12A:
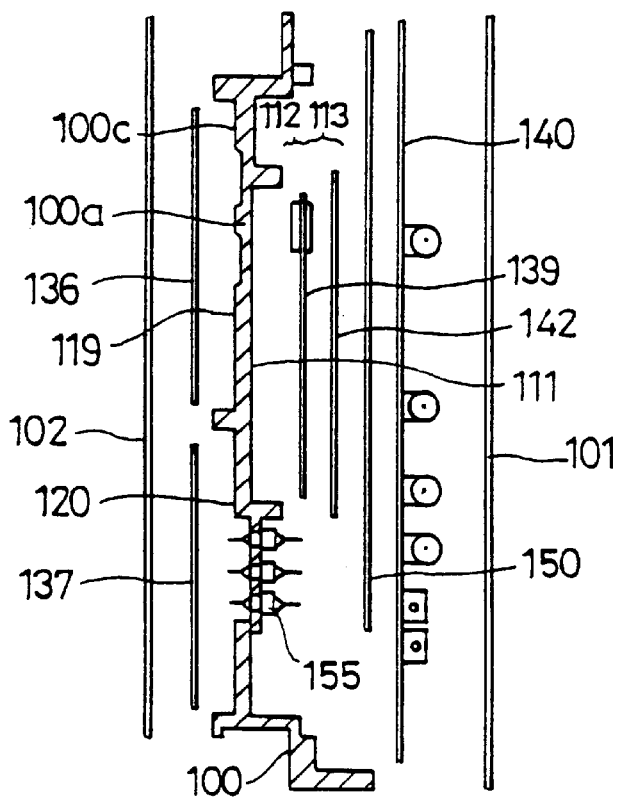
FIG. 12A and FIG. 12B are diagrams for explaining an essential portion of the transmitter/receiver/modem block indicated by a character B in FIG. 9B.
Figure 12B:
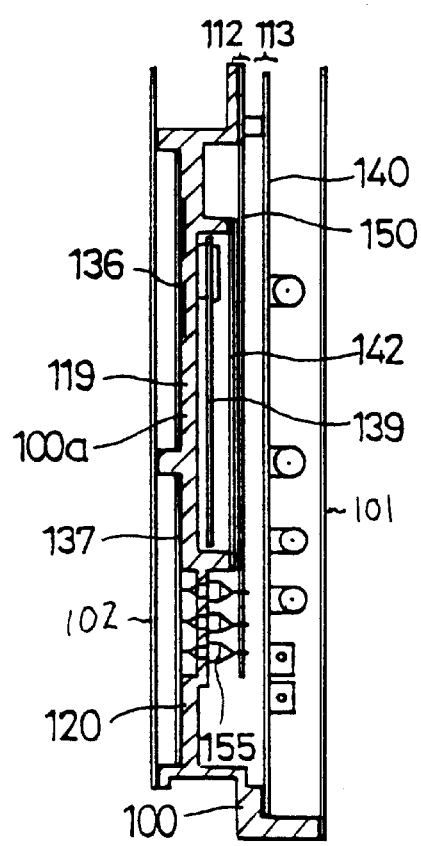
Figure 13A:
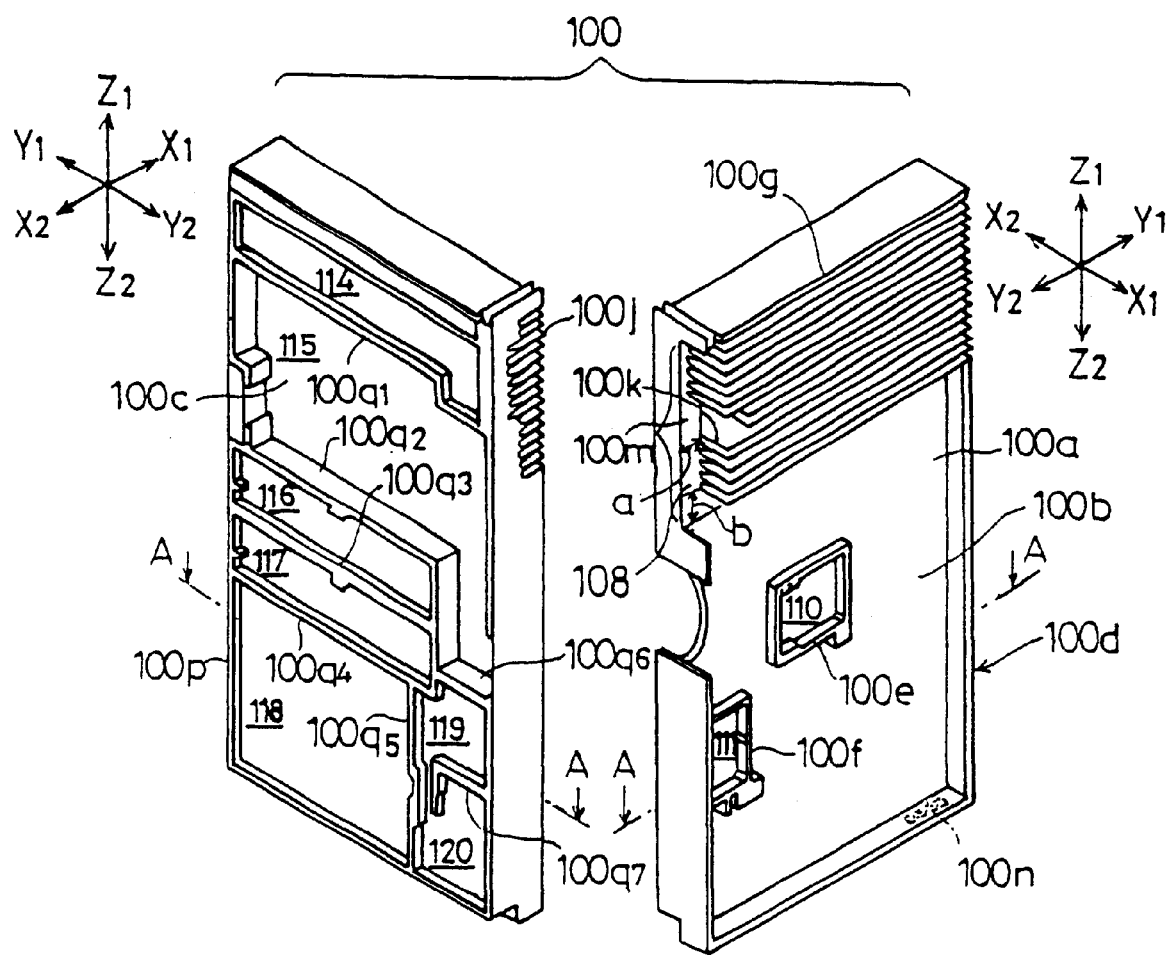
FIG. 13A and FIG. 13B are diagrams for explaining a supporting board of the communication device.
Figure 13B:
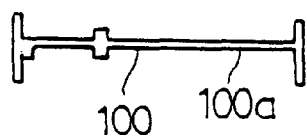

FIG. 8A, FIG. 8B and FIG. 8C are diagrams for explaining the transmitter/receiver/modem block 70 of the communication device 50. FIG. 9A, FIG. 9B, FIG. 9C and FIG. 9D are diagrams for explaining the transmitter/receiver/modem block 70 of the communication device 50. FIG. 10A and FIG. 10B are diagrams for explaining an essential portion of the transmitter/receiver/modem block 70 indicated by a character A in FIG. 9B. FIG. 11A and FIG. 11B are cross-sectional views of the transmitter/receiver/modem block 70 taken along a line XI—XI indicated in FIG. 9A. FIG. 12A and FIG. 12B are diagrams for explaining an essential portion of the transmitter/receiver/modem block 70 indicated by a character B in FIG. 9B. FIG. 13A and FIG. 13B are diagrams for explaining a supporting board 100 of the communication device 50.

The block 70 is constructed by a generally rectangular supporting board 100, a front cover 101, a back cover 102, various circuit modules 130 through 140, and a wiring board 150.

The supporting board 100 is provided in a slender rectangular formation, and is remarkably small in width in the directions X1 and X2. The supporting board 100 generally has a plate portion 100a, a front surface 100b, and a back surface 100c. The supporting board 100 includes a plurality of fins 100g on the front surface 100b. The supporting board 100 includes a plurality of forced air-cooling fans 103-1 through 103-4, attached to the supporting board 100. The front cover 101 encloses the front surface 100b of the supporting board 100, and the front cover 101 and the fins 100g form a plurality of ducts 105. Further, the front cover 101 and the front surface 100b form an internal opening 107 under the fins 100g. The back cover 102 encloses the back surface 100c of the supporting board 100.

In FIG. 8A, the indication of the front cover 101 is omitted. In FIG. 9A, the indication of the back cover 102 is omitted. FIG. 9B is a cross-sectional view of the block 70 taken along a line B—B indicated in FIG. 9A.

The circuit modules, contained in the supporting board 100, include a high-output amplification circuit module 130, a high-output amplification circuit module 131, a power supply circuit module 132, a receiver circuit module 133, a receiver circuit module 134, an oscillator circuit module 135, a transmitter circuit module 136, a transmitter circuit module 137, a circuit module 138, a circuit module 139, and a large-size circuit module 140. The power supply circuit module 132 includes a connector 132a.

The high-output amplification circuit modules 130 and 131 constitute an amplification part of the transmitter unit 83. The power supply circuit module 132 constitutes the power supply unit 90. The receiver circuit modules 133 and 134 constitute the receiver unit 84. The transmitter circuit modules 136 and 137 and the circuit modules 138 and 139 constitute the remaining part of the transmitter unit 83. The oscillator circuit module 135 constitutes the transmitting oscillator 88 and the receiving oscillator 89.

The circuit module 140 constitutes a plurality of circuits equivalent to the baseband processing unit 81, the modulation unit 82, the demodulation unit 85, the transmitting terminal switch 86 and the receiving terminal switch 87 as in the block 70 of FIG. 7.

In the supporting board 100, the high-output amplification circuit modules 130 and 131, the power supply circuit module 132, and the large-size circuit module 140 are heat-radiating elements. As shown in FIG. 6, the heat-radiating circuit modules 130 and 131 and the heat-radiating power supply circuit module 132 are provided between the back cover 102 and the back surface 100c of the supporting board 100 at positions adjacent to the fins 100g on the front surface 100b. The heat-radiating circuit module 140 is provided within the opening 107 formed by the front cover 101 and the front surface 100b.

When the forced air-cooling fans 103-1 through 103-4, operate, the fans 103-1 through 103-4, produce a flow of air along the plurality of ducts 105 to cool the high-output amplification circuit modules 130 and 131, and the fans 103-1 through 103-4, produce a flow of air within the opening 107 to cool the heat-radiating circuit module 140.

The wiring board 150 functions to supply power produced by the power supply circuit module 132, to the circuit modules 130, 131, 133–140. The wiring board 150 is provided in a generally L-shaped formation, and does not interfere circuit module mounting areas 110 and 111 of the front surface 100b. The wiring board 150 includes a connector 150a and a wiring pattern 150b connected to the connector 150a.

The supporting board 100 is made of an aluminum alloy. The supporting board 100 includes the plate portion 100a, the front surface 100b, and the back surface 100c.

FIG. 10B is a cross-sectional view of the portion "A" of the block 70 after assembly, and FIG. 10A is a cross-sectional view of the portion "A" before assembly. FIG. 12B is a cross-sectional view of the portion "B" of the block 70 after assembly, and FIG. 12A is a cross-sectional view of the portion "B" before assembly. FIG. 11B is a cross-sectional view of the block 70 after assembly, taken along the line XI—XI of FIG. 9A, and FIG. 11A is a cross-sectional view of the portion of the block 70 before assembly, taken along the line XI—XI of FIG. 9A.

The supporting board 100 includes a peripheral rib 100d, rectangular ribs 100e and 100f, and the plurality of fins 100g on the front surface 100b. The fins 100g extend in parallel in the directions Y1 and Y2 and are formed only at an upper portion of the front surface 100b. The fins 100g have top surfaces 100h, and the top surfaces 100h of the fins 100g and the peripheral rib 100d have the same height (H1) on the front surface 100b. A plurality of grooves 100i between the fins 100g are formed. As shown in FIG. 13A, an opening 100j is formed at an end of each of the grooves 100i. Each of the fins 100g has an end portion 100k, and the end portion 100k is provided at a distance "a" away from the side edge of the plate portion 100a. A flat portion 100m is formed on the left side of the fins 100g and beneath the fins 100g. The flat portion 100m beneath the fins 100g has a vertical width "b".

When the front cover 101 is attached to the supporting board 100, the front cover 101 is brought into contact with the top surfaces 100h of the fins 100g. The front cover 101 and the fins 100g form the plurality of ducts 105. Each of the ducts 105 has an air-inlet opening 105a at the right side end of the duct 105. As shown in FIG. 8A through FIG. 9D, the forced air-cooling fans 103-1 through 103-4, are attached to the supporting board 100. An air chamber 106 is formed between the fins 100g and the fans 103-1 through 103-4,. Further, the front cover 101 and the front surface 100b form the internal opening 107 under the fins 100g. The air chamber 106, acting as a suction opening of the fans 103-1 through 103-4,, communicates with the ducts 105 and communicates with the opening 107 under the fins 10g via an opening 106a. Further, a plurality of air-inlet openings 100n are formed at a bottom right corner of the supporting board 100 by cutting out the peripheral rib 100d at the corresponding position. Hence, when the forced air-cooling fans 103-1 through 103-4, operate, the fans 103-1 through 103-4, produce a flow of air along the plurality of ducts 105 to cool the high-output amplification circuit modules 130 and 131, and the fans 103-1 through 103-4, produce a flow of air within the opening 107 to cool the heat-radiating circuit module 140.

As shown in FIG. 13A, the circuit module mounting areas 110 and 111 are formed by the rectangular ribs 100e and 100f on the front surface 100b of the supporting board 100. Further, a wiring board mounting area for mounting the wiring board 150 therein is formed on the front surface 100b of the supporting board 100.

The supporting board 100 includes a peripheral rib 100p and various divider ribs 100q1 through 100q9 on the back surface 100c. A number of circuit module mounting areas 114 through 120 are formed on the back surface 100c by the divider ribs 100q1 through 100q9. The circuit module mounting areas 114 and 115 are provided at the positions adjacent to the fins 105 on the front surface 100b. When the back cover 102 is attached to the supporting board 100, the back cover 102 is brought into contact with all the divider ribs 100q1 through 100q9. Hence, the circuit module mounting areas 114 through 120 are formed as internal openings by the back cover and the back surface 100c. As shown in FIG. 8B, a plurality of ventilation holes 115a which communicate with the internal opening 115 are formed by cutting the peripheral rib 100p at the corresponding positions.

As shown in FIG. 9A through 10B, the high-output amplification circuit modules 130 and 131 are fitted to the circuit module mounting area 114 of the back surface 100c. The power supply circuit module 132 is fitted to the circuit module mounting area 115 of the back surface 100c.

As shown in FIG. 9A and FIG. 11B, the receiver circuit module 133 is fitted to the circuit module mounting area 116 of the back surface 100c, the receiver circuit module 134 is fitted to the circuit module mounting area 117 of the back surface 100c, and the oscillator circuit module 135 is fitted to the circuit module mounting area 118 of the back surface 100c.

As shown in FIG. 9A and FIG. 12B, the transmitter circuit module 136 is fitted to the circuit module mounting area 119 of the back surface 100c, and the transmitter circuit module 137 is fitted to the circuit module mounting area 120 of the back surface 100c.

As shown in FIG. 8A and FIG. 13A, the circuit module 138 is fitted to the circuit module mounting area 110 on the front surface 100b, and the circuit module 139 is fitted to the circuit module mounting area 111 on the front surface 100b. A lid 141 is attached to the rib 10e so as to enclose the circuit module 138 in the mounting area 110. A lid 142 is attached to the rib 100f so as to enclose the circuit module 139 in the mounting area 111.

As shown in FIG. 8A and FIG. 9B, the wiring board 150 is fitted to the wiring board mounting area on the front surface 100b. As shown in FIG. 11A and FIG. 11B, the connector 150a of the wiring board 150 is inserted into a hole 100a1 of the plate portion 100a, and connected to a connector 132a of the power supply circuit module 132.

As shown in FIG. 12A and FIG. 12B, a plurality of capacitors 155 pass through the plate portion 100a in the mounting area 120. The wiring pattern 150b of the wiring board 150 on the front surface 100b is connected through the capacitors 155 to the transmitter circuit module 137 on the back surface 100c. Similarly, the wiring pattern 150b of the wiring board 150 on the front surface 100b is connected to the receiver circuit modules 133 and 134, the oscillator circuit module 135 and the transmitter circuit module 136.

As shown in FIG. 9A and FIG. 9B, the power supply circuit module 132 is connected to the high-output amplification circuit modules 130 and 131 via a wiring board 156, a capacitor 157 and a wiring board 158.

As shown in FIG. 8A and FIG. 12B, the large-size circuit module 140 is fitted to the circuit module mounting area of the front surface 100b. The wiring board 150 is covered with the large-size circuit module 140. The lids 141 and 142, which cover the circuit modules 138 and 139, serve to prevent interference between the circuit module 138 and the circuit module 140 and interference between the circuit module 139 and the circuit module 140.

As shown in FIG. 5 and FIG. 9A, the large-size circuit module 140 has a front surface 169, and a cover 175 is attached to the front surface 169 by a latch 176. The cover 175 has a plurality of mesh-form openings 175a at locations confronting the forced air-cooling fans 103-1 through 103-4. The fans 103-1 through 103-4, produce a flow of air passing through the openings 175a so as to cool the heat-radiating circuit module 140.

The transmitter/receiver/modem block 70 in the present embodiment is capable of plug-in connection installation. As shown in FIG. 8B, the block 70 has a rear surface 160 on which a primary power supply connector 161 and a plurality of plug-in connector plugs 162, 163 and 164 (which are, for example, microwave plug-in connectors OSP/OOSP from M/A-COM Inc.) are provided. The primary power supply connector 161 is internally connected to the power supply circuit module 132. The plug-in connector plugs 162 and 163 are internally connected to the receiver circuit modules 133 and 134. The plug-in connector plug 164 is internally connected to the high-voltage circuit module 130.

As shown in FIG. 9C and FIG. 9D, the large-size circuit module 140 has a bottom surface 165 on which a guide rail 166 is provided, and has a top surface 167 on which a guide rail 168 is provided. As shown in FIG. 9A, the large-size circuit module 140 includes a lock lever 170 and a thumb screw 171 at the front bottom portions of the surface 169, and includes a thumb screw 172 at the front upper portion of the surface 169.

FIG. 14A and FIG. 14B are diagrams for explaining an adapter 72 of the communication device 50. FIG. 14B is a front view of the adapter 72, and FIG. 14A is a cross-sectional view of the adapter 72 taken along a line A—A indicated in FIG. 14B. One of the adapters 72 in the communication device 50 of the present embodiment, as shown in FIG. 2, is illustrated in FIG. 14A and FIG. 14B.

The adapter 72 generally has, as shown in FIG. 14A and FIG. 14B, a primary power supply connector 181, a plurality of plug-in connector receptacles 182, 183 and 184, and a plurality of locating pins 186 and 187.

The shelf 71 includes, as shown in FIG. 5, a pair of rear supports 190 and 191. The adapter 72 is attached to the shelf 71 by flexibly positioning it to the shelf 71 and fastening screws to the rear supports 190 and 191. The transmitter/receiver/modem block 70 includes the primary power supply connector 161. The primary power supply connector 181 of the adapter 72 and the primary power supply connector 161 of the block 70 are plug-in connected to each other within the shelf 71 with no need for a special tool. Also, the transmitter/receiver/modem block 70 includes the plurality of plug-in connector plugs 162, 163 and 164. The plug-in connector receptacles 182–184 and the plug-in connector plugs 162–164 are fitted to each other within the shelf 71 with no need for a special tool. Each of the plug-in connector receptacles 182–184 includes, as shown in FIG. 4, a spring 185. The springs 185 of the plug-in connector receptacles 182–184 provide firm connection between the receptacles 182–184 and the plugs 162–164.

As shown in FIG. 4, pipe cables 192, 193 and 194 are connected at the ends to the plug-in connector receptacles 182, 183 and 184 of the adapter 72, and the pipe cables 192–194 are routed to the antenna via the filters 56 of the common component 52. A bracket 195 is attached to the top of the adapter 72. A plurality of connectors 196, 197 and 198 are provided on the bracket 195 of the adapter 72, and the pipe cables 192, 193 and 194 are connected at the other ends to the connectors 196, 197 and 198.

As shown in FIG. 14A and FIG. 14B, a noise filter 199 is provided at an upper portion of the adapter 72. The noise filter 199 acts to cut noise that is delivered to the primary power supply. A bracket 200 is attached to the front of the adapter 72, and an external power supply connector 201 is provided on the bracket 200 of the adapter 72. The external power supply connector 201 is connected to the primary power supply connector 181 via the noise filter 199.

An external power supply (not shown) is connected to the external power supply connector 201. With the common component 52 installed in the frame 51 as shown in FIG. 1, the connectors 196, 197 and 198 of the adapter 72 are connected to one of the filters 56 of the common component 52. Similarly, the connectors 196, 197 and 198 of the other adapters 72 are connected to the other filters 56 of the common component 52.

In the present embodiment, the transmitter/receiver/modem block 70 and the adapter 72 are configured such that the air-inlet openings 105a of the ducts 105 are not closed by the adapter 72. Hence, when the fans 103-1 through 103-4, operate, the fans 103-1 through 103-4, produce the flow of air along the ducts 105. The adapter 72 has an open configuration on the front side of the adapter 72 to which the block 70 is connected.

As shown in FIG. 4 and FIG. 5, the shelf 71 includes a plurality of guide rails 210 on the bottom of the shelf 71 and a plurality of guide rails 211 at an upper portion of the shelf 71. Each of the guide rails 210 and 211 has a recessed groove extending in the directions Y1 and Y2. In the shelf 71, the guide rails 210 and the guide rails 211 confront each other. The guide rails 210 and the guide rails 211 extend in the directions Y1 and Y2 and arranged side by side with a distance "W1" between two adjacent ones of such guide rails. The distance "W1" between the guide rails is set so as to conform with a width of the transmitter/receiver/modem block 70.

As shown in FIG. 5, a plurality of brackets 212 are attached to the front ends of the guide rails 210, and a plurality of brackets 213 are attached to the front ends of the guide rails 211, respectively. A threaded portion 214 is formed in each of the brackets 212, and a threaded portion 215 is formed in each of the brackets 213.

In the transmitter/receiver/modem component 53 of the present embodiment, the eight adapters 72 are installed to the back of the shelf 71 and the eight transmitter/receiver/modem blocks 70 are installed to the front of the shelf 71. The blocks 70 and the adapters 72 are connected to each other within the shelf 71 by using the plug-in connectors. The shelf 71 is installed in the frame 51.

Each of the transmitter/receiver/modem blocks 70 includes the guide rail 166 on the bottom of the block 70 and the guide rail 168 on the top of the block 70. The insertion of each of the blocks 70 into the shelf 71 in the direction Y1 is guided by both the connection of the guide rail 166 and the guide rail 210 and the connection of the guide rail 168 and the guide rail 211. Each of the transmitter/receiver/modem blocks 70 includes the lock lever 170 at the front bottom portion of the block 70. After the block 70 is inserted into the shelf 71, the lock lever 170 is moved to the locked position so that the block 70 is fixed in the shelf 71. The locating pins 186 and 187 of the adapters 72 at this time are placed at given positions on the transmitter/receiver/modem blocks 70, so that the primary power supply connectors 161 and the primary power supply connectors 162 are firmly connected by the plug-in connection, and the plug-in connector plugs 162–164 and the plug-in connector receptacles 182–184 are firmly connected by the plug-in connection. Finally, the thumb screws 171 and 172 are fastened, at each of the front bottom portions of the transmitter/receiver/modem blocks 70, to the threaded portions 214 and 215.

A description will now be given of the heat radiation of the transmitter/receiver/modem blocks 70 in the transmitter/receiver component 53. In the present embodiment, the high-voltage circuit modules 130 and 131, the power supply circuit module 132, and the large-size circuit module 140 are the heat-radiating elements.

When the forced air-cooling fans 103-1 through 103-4, operate, the adapter 72 does not close the openings 105a of the transmitter/receiver/modem blocks 70. As shown in FIG. 8A, the fans 103-1 through 103-4, produce the flow of air outgoing from the air chamber 106 in the directions indicated by the arrows 220. At the same time, the fans 103-1 through 103-4, produce the flow of air incoming from the openings 105a in the direction indicated by the arrow 221, and produce the flow of air along the ducts 105 in the directions indicated by the arrows 222. The heat-radiating fins 100g are cooled by the flow of air produced by the fans 103-1 through 103-4,. Secondly, the fans 103-1 through 103-4, produce the flow of air from the air-inlet openings 100n into the internal opening 107 in the direction indicated by the arrow 223. This suction air flows from the internal opening 107 to the air chamber 106 in the directions indicated by the arrows 224.

Further, as shown in FIG. 10, the heat from the circuit modules 130 and 131 is transferred to the fins 100g of the supporting board 100 as indicated by the arrows 230 and the arrows 231. As described above, the fins 100g are cooled by the flow of air produced by the fans 103-1 through 103-4.

In the above-described embodiment, the forced air cooling by the forced air-cooling fans 103-1 through 103-4, in each of the transmitter/receiver/modem blocks 70 is effectively used in common for cooling the high-output amplification circuit modules 130 and 131 and the power supply circuit module 132 on the rear surface and for cooling the large-size circuit module 140 on the front surface. Hence, it is possible for the communication device 50 of the present embodiment to effectively cool the heat-radiating circuit boards in the frame 51 of the communication device 50 during operation. At the same time, the transmitter/receiver/modem blocks 70 are installed into the shelf 71 in vertical positions, and the communication device 50 of the present embodiment requires only a narrow installation space on the site of the user.

When a malfunction in the communication device 50 occurs, it is necessary to remove the transmitter/receiver/modem blocks 70 from the shelf 71 in order to find out a defective block 70 in the communication device 50, replace it with a new block 70, and confirm that the communication device 50 regains a normal operation by the replacement. Before the blocks 70 are removed from the shelf 71, it is not necessary to loosen the nuts by using a tool and disconnect the pipe cables from the communication device 50. Hence, the communication device 50 does not require much expense in time and effort to recover the communication device 50 from the malfunction.

Next, a description will be given of a forced air-cooling fan control of the forced air-cooling fans 103-1 through 103-4, in the transmitter/receiver/modem block 70 of the communication device 50.

Figure 15:
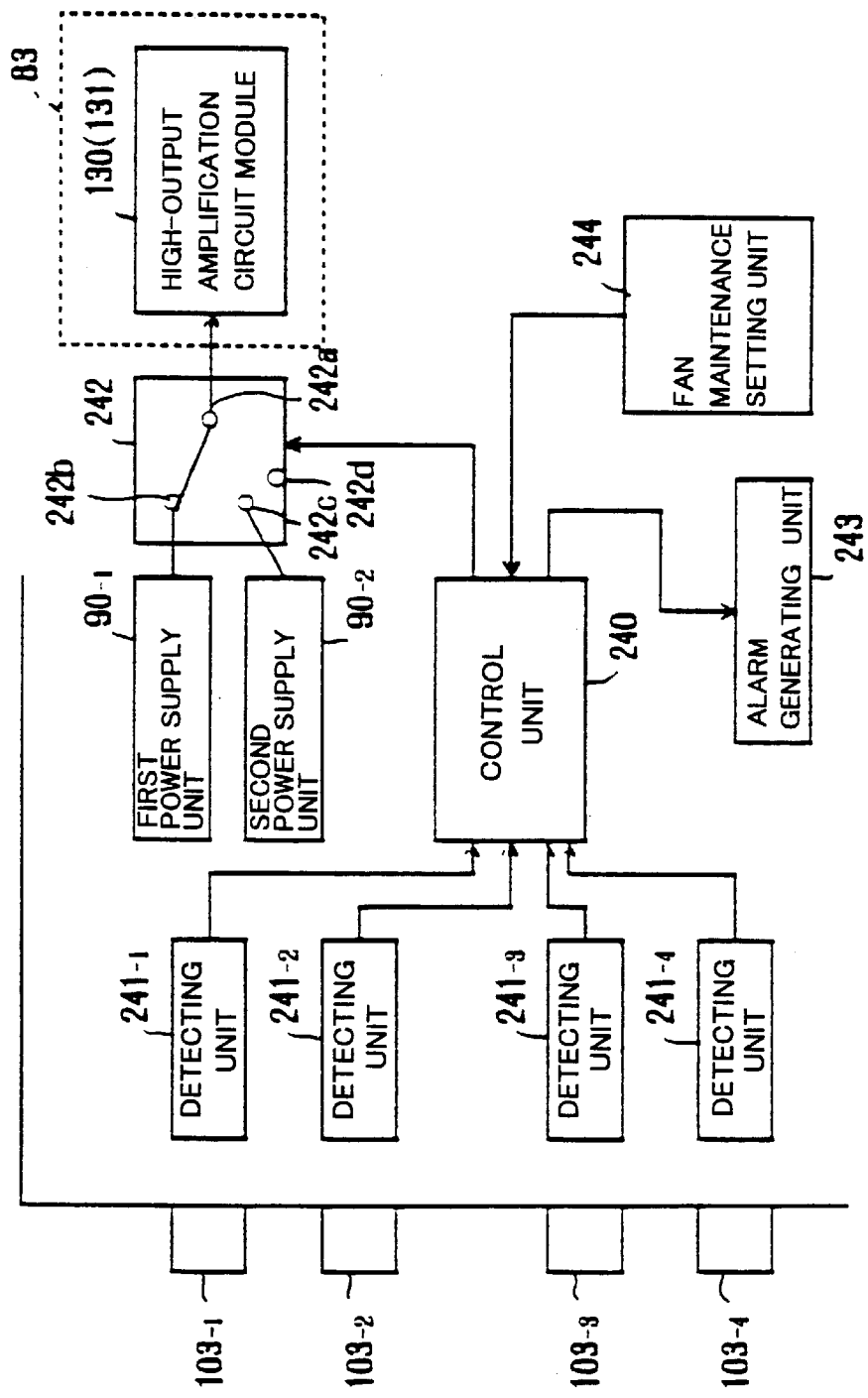
FIG. 15 is a block diagram of a control unit of the transmitter/receiver/modem block of the communication device.

FIG. 15 is a block diagram of a control unit of the transmitter/receiver/modem block 70.

In the transmitter/receiver/modem block 70 of the present embodiment, the four forced air-cooling fans 103-1 through 103-4, are provided to effectively cool the heat-radiating circuit modules by using the forced air-cooling.

The transmitter/receiver/modem block 70 includes, as shown in FIG. 15, a control unit 240, a number of fan rotating speed detecting units 241-1, 241-2, 241-3 and 241-4, a switching unit 242, an alarm generating unit 243, and a fan maintenance setting unit 244, in addition to the elements 81–89 of FIG. 7. In the transmitter/ receiver/ modem block 70 of FIG. 15, a first power supply unit 90-1 and a second power supply unit 90-2 which constitute the power supply unit 90 of FIG. 7 are included.

The fan rotating speed detecting units 241-1 through 241-4, corresponding to the number of the forced air-cooling fans 103-1 through 103-4, are provided in the transmitter/receiver/modem block 70. The control unit 240 detects whether a defective decrease of the fan rotating speed occurs in any of the fans 103-1 through 103-4, based on the fan rotating speed data supplied by the detecting units 241-1 through 241-4. The detecting units 241-1 through 241-4 output, to the control unit 240, the fan rotating speed data determined based on the count of pulses output by each of the fans 103-1 through 103-4. When a defective decrease of the fan rotating speed related to one of the fans 103-1 through 103-4, is detected, the control unit 240 determines that the related forced air-cooling fan 103 is defective.

The first power supply unit 90-1 and the second power supply unit 90-2 are connected through the switching unit 242 to the high-output amplification circuit modules 130 and 131 of the transmitter unit 83. The first power supply unit 90-1 supplies a normal-level source voltage (for example, 10 V) to the circuit modules 130 and 131 when no defect occurs. The second power supply unit 90-2 supplies a lowered-level source voltage (for example, 7 V) to the circuit modules 130 and 131 when a defect in the fans 103-1 through 103-4, occurs.

The switching unit 242 has, as shown in FIG. 15, an output terminal 242a connected to the circuit modules 130 and 131. The switching unit 242 has an input terminal 242b connected to the first power supply unit 90-1, an input terminal 242c connected to the second power supply unit 90-2, and an input terminal 242d not connected to the power supply units 90-1 and 90-2. A switching action of the switching unit 242 to connect one of the input terminals 242b–242d to the output terminal 242a is controlled by the control unit 240 depending on the number of defective fans in the block 70.

In the present embodiment, the switching action of the switching unit 242 is controlled by the control 240 as follows. When no defect occurs in the fans 103-1 through 103-4, the switching unit 242 connects the input terminal 242b and the output terminal 242a, and the normal-level source voltage (10 V) output by the first power supply unit 90-1 is supplied to the circuit modules 130 and 131 via the switching unit 242.

When two defective fans in the block 70 are detected by the detecting units 241-1 through 241-4, the switching unit 242 is actuated by the control unit 240 to connect the input terminal 242c and the output terminal 242a, and the lowered-level source voltage (7 V) output by the second power supply 90-2 is supplied to the circuit modules 130 and 131 via the switching unit 242. A power consumption of the high-output amplification circuit modules 130 and 131 of the transmitter unit 83 is automatically reduced with the lowered-level source voltage supplied. The forced air-cooling fan control of the present embodiment is called automatic transmission power control (ATPC). Hence, even when only two of the forced air-cooling fans 103-1 through 103-4, are normally operating, it is possible for the communication device 50 to maintain the heat-radiating circuit modules 130 and 131 at a suitable temperature. According to the forced air-cooling fan control of the present embodiment, the transmitter/receiver/modem block 70 continues to normally operate.

When three defective fans in the block 70 are detected by the detecting units 241-1 through 241-4, the switching unit 242 is actuated by the control unit 240 to connect the input terminal 242d and the output terminal 242a, and no source voltage is supplied to the circuit modules 130 and 131. The transmission of a radio signal by the transmitter unit 83 is stopped.

In the present embodiment, in order to avoid discontinuation of communications over the network, the control unit 240 of the transmitter/receiver/modem block 70-8 provided for the protection channel line is configured as follows. When two defective fans in one of the blocks 70-1 through 70-7 provided for the working channel lines are detected, the control unit 240 of the block 70-8 starts an operation of the block 70-8 for the protection channel line.

At this time, in the defective block 70 (or one of the blocks 70-1 through 70-7 for the working channel lines) with the defective two fans detected, the switching unit 242 connects the input terminal 242c and the output terminal 242a, and the lowered-level source voltage output by the second power supply 90-2 is supplied to the circuit modules 130 and 131. In the defective block 70, the control unit 240 outputs an alarm signal through the alarm generating unit 243, and transmits a notification of the malfunction to the control component 54. The control component 54 transmits the notification of the malfunction through the working channel line to an operating center. The user at the operating center is notified that the malfunction occurs and a fan maintenance or a recovery procedure is needed. The fan maintenance setting unit 244 is set by the user when a fan maintenance is conducted. When the fan maintenance setting unit 244 is set by the user, the fan maintenance setting unit 244 outputs to the control unit 240 a signal indicating that the transmitter/receiver/modem block 70 is under the fan maintenance.

Figure 16:
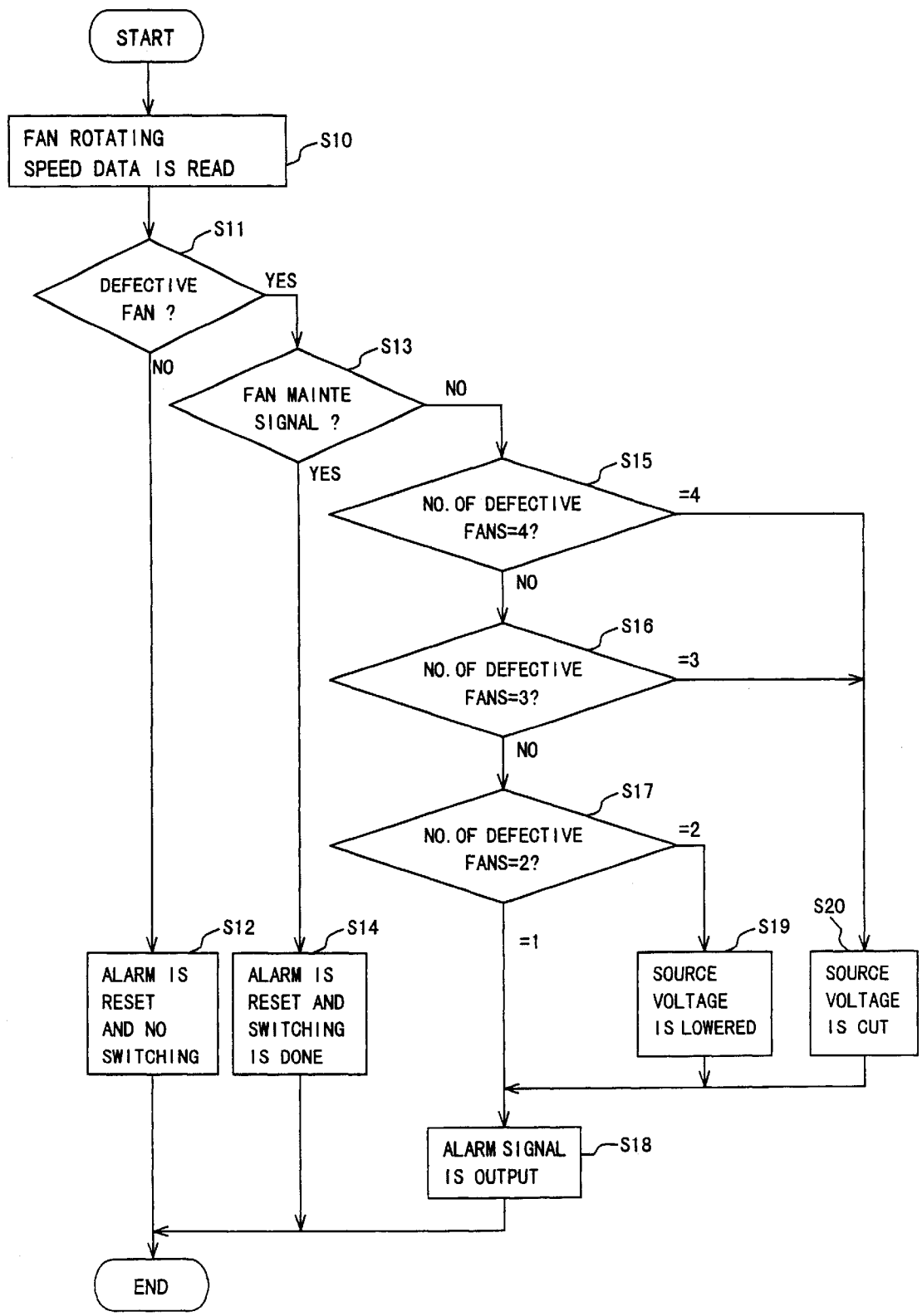
FIG. 16 is a flowchart for explaining a forced air-cooling fan control operation executed by the control unit of the transmitter/receiver/modem block of FIG. 15.

FIG. 16 is a flowchart for explaining a forced air-cooling fan control operation executed by the control unit 240 of the transmitter/receiver/modem block 70 of FIG. 15.

As shown in FIG. 16, the control unit 240 at step S10 reads the fan rotating speed data from the detecting units 241-1 through 241-4. The control unit at step S11 detects whether any of the fans 103-1 through 103-4, is defective.

When the fans 103-1 through 103-4, are normally operating, the control unit 240 at step S12 resets a fan alarm flag to zero. The switching unit 242 is not actuated by the control unit 240 to perform a switching action.

When any of the fans 103-1 through 103-4 is defective, the control unit 240 at step S13 detects whether a fan maintenance signal is output by the fan maintenance setting unit 244.

When the fan maintenance signal is output, the control unit 240 at step S14 resets the fan alarm flag to zero, and controls the switching unit 242 such that the switching unit 242 is actuated to connect the input terminal 242c and the output terminal 242a. The lowered-level source voltage output by the second power supply 90-2 is supplied to the circuit modules 130 and 131 via the switching unit 242.

When the fan maintenance signal is not output, the control unit 240 at step S15 detects whether the number of defective fans in the block 70 is equal to 4. Similarly, the control unit 240 at step S16 detects whether the number of defective fans in the block 70 is equal to 3, and at step S17 detects whether the number of defective fans in the block 70 is equal to 2. Hence, by executing the steps S15–S17, the number of defective fans in the block 70 can be determined by the control unit 240.

When one of the fans 103-1 through 103-4 is defective, the control unit 240 at step S18 outputs an alarm signal through the alarm generating unit 243.

When two of the fans 103-1 through 103-4 are defective, the control unit 240 at step S19 controls the switching unit 242 such that the switching unit 242 is actuated to connect the input terminal 242c and the output terminal 242a. The low-level source voltage output by the second power supply 90-2 is supplied to the circuit modules 130 and 131 via the switching unit 242. After the step S19 is performed, the control unit 240 performs the step S18 so that the alarm signal is output.

When three or four of the fans 103-1 through 103-4, are defective, the control unit 240 at step S20 controls the switching unit 242 such that the switching unit 242 is actuated to connect the input terminal 242d and the output terminal 242a. The source voltage supplied to the circuit modules 130 and 131 is cut off by the switching unit 242. After the step S20 is performed, the control unit 240 performs the step S18 so that the alarm signal is output.

According to the control operation of FIG. 16, the control unit 240 controls the communication device 50 in the present embodiment, as follows. When the number of defective fans in one of the transmitter/receiver/modem blocks 70 is less than a predetermined value (for example, 3), the control unit 240 outputs an alarm signal through the alarm generating unit 243, and controls the power supply circuit module 132 of one of the transmitter/receiver/modem blocks 70 such that power supplied to the transmitter circuit module 136 or 137 by the power supply circuit module 132 is lowered. When the number of defective fans exceeds the predetermined value (for example, 3), the control unit 240 outputs an alarm signal through the alarm generating unit 243 and starts the operation of one of the transmitter/receiver/modem blocks 70 for the protection channel line.

In the communication device of the present embodiment, the control unit starts the operation of the transmitter/receiver/modem block provided for the protection channel line, when a malfunction of the fans of one of the transmitter/receiver/modem blocks, provided for the plurality of working channel lines, occurs. It is possible for the communication device of the present embodiment to avoid discontinuation of communications over the network if a serious malfunction in the communication device occurs. At the same time, the communication device of the present embodiment can provide a notification of the malfunction to the user.

The present invention is not limited to the above-described embodiment, and variations and modifications may be made without departing from the scope of the present invention.

Further, the present invention is based on Japanese priority application 10-105036, filed on Apr. 15, 1998, the entire contents of which are hereby incorporated by reference.

What is claimed is:

1. A communication device in which a number of transmitter/receiver/modem blocks are installed in vertical positions, each of the transmitter/receiver/modem blocks comprising:

a supporting board having a front surface and a back surface, the supporting board including a plurality of fins on the front surface and a plurality of forced air-cooling fans on the supporting board;

a front cover for enclosing the front surface of the supporting board, the front cover and the fins forming a plurality of ducts, the front cover and the front surface forming an internal opening under the fins;

a back cover for enclosing the back surface of the supporting board;

first heat-radiating circuit modules provided between the back cover and the back surface at positions adjacent to the fins on the front surface; and a second heat-radiating circuit module provided within the opening formed by the front cover and the front surface;

wherein, when the forced air-cooling fans operate, the fans produce a flow of air along the plurality of ducts to cool the first heat-radiating circuit modules, and the fans producing a flow of air within the opening to cool the second heat-radiating circuit board.

2. A communication device in which a number of transmitter/receiver/modem blocks are installed in vertical positions, the communication device being linked to a network by a corresponding number of channel lines, each of the transmitter/receiver/modem blocks comprising:

a supporting board having a front surface and a back surface, the supporting board including a plurality of fins on the front surface and a plurality of forced air-cooling fans on the supporting board;

a front cover for enclosing the front surface of the supporting board, the front cover and the fins forming a plurality of ducts, the front cover and the front surface forming an internal opening under the fins;

a back cover for enclosing the back surface of the supporting board;

a transmitter circuit module;

a receiver circuit module;

a heat-radiating amplification circuit module;

a heat-radiating power supply circuit module; and a heat-radiating modem circuit module, the transmitter circuit module, the receiver circuit module, the amplification circuit module, the power supply circuit module and the modem circuit module being connected together to allow communications over the network by using a corresponding one of the channel lines, both the amplification circuit module and the power supply circuit module provided between the back cover and the back surface at positions adjacent to the fins on the front surface;

the modem circuit module provided within the opening formed by the front cover and the front surface;

wherein, when the forced air-cooling fans operate, the fans produce a flow of air along the plurality of ducts to cool the amplification and power supply circuit modules, and the fans producing a flow of air within the opening to cool the modem circuit board.

3. The communication device according to claim 2, wherein, in each of the transmitter/receiver/model blocks, the plurality of ducts have open ends extending to the forced air-cooling fans, and the supporting board includes an air chamber communicating with the opening formed by the front cover and the front surface.

4. The communication device according to claim 2, wherein, in each of the transmitter/receiver/model blocks, the power supply circuit module is provided adjacent to the fins on the front surface, and the transmitter circuit module and the receiver circuit module are provided at positions apart from the fins on the front surface.

5. A communication device in which a number of transmitter/receiver/modem blocks are installed into a shelf in vertical positions, the communication device being linked to a network by a corresponding number of channel lines, each of the transmitter/receiver/modem blocks comprising:
    a supporting board having a front surface and a back surface,
    a transmitter circuit module provided on one of the front surface and the back surface of the supporting board;
    a receiver circuit module provided on one of the front surface and the back surface of the supporting board; and
    a power supply circuit module provided on one of the front surface and the back surface of the supporting board;
the transmitter circuit module, the receiver circuit module, and the power supply circuit module being connected together to allow communications over the network by using a corresponding one of the channel lines,
each of the transmitter/receiver/modem blocks being configured such that the transmitter/receiver/modem block can be inserted into or removed from the shelf without using a tool,
the transmitter/receiver/modem block including plug-in connector plugs at insertion ends of the transmitter circuit module and the receiver circuit module and a first power supply connector at an insertion end of the power supply circuit module,
the shelf including plug-in connector receptacles at positions of the insertion ends of the transmitter circuit module and the receiver circuit module and a second power supply connector at a position corresponding to the insertion end of the power supply circuit module,
wherein the plug-in connector plugs are fitted to the plug-in connector receptacles and the first power supply connector is fitted to the second power supply connector when the transmitter/receiver/modem block is inserted into the shelf.

6. A communication device in which a number of transmitter/receiver/modem blocks are installed in vertical positions, the communication device being linked to a network by a corresponding number of channel lines, each of the transmitter/receiver/modem blocks comprising:
    a supporting board having a front surface and a back surface, the supporting board including a plurality of forced air-cooling fans on the supporting board;
    a transmitter circuit module provided on one of the front surface and the back surface of the supporting board;
    a receiver circuit module provided on one of the front surface and the back surface of the supporting board; and
    a power supply circuit module provided on one of the front surface and the back surface of the supporting board;
    the transmitter circuit module, the receiver circuit module, and the power supply circuit module being connected together to allow communications over the network by using a corresponding one of the channel lines,
the channel lines including a plurality of working channel lines and a protection channel line,
the communication device comprising a control unit for starting an operation of one of the transmitter/receiver/modem blocks, provided for the protection channel line, when a malfunction of the fans of one of the transmitter/receiver/modem blocks, provided for the plurality of working channel lines, occurs.

7. The communication device according to claim 6, wherein, when the number of defective fans in said one of the transmitter/receiver/modem blocks for the working channel lines is less than a predetermined value, the control unit controls the power supply circuit module of said one of the transmitter/receiver/modem blocks such that power supplied to the transmitter circuit module by the power supply circuit module is lowered, and when the number of defective fans exceeds the predetermined value, the control unit starts the operation of the transmitter/receiver/modem block for the protection channel line.

8. The communication device according to claim 6, wherein, when the number of defective fans in said one of the transmitter/receiver/modem blocks for the working channel lines is less than a predetermined value, the control unit outputs an alarm signal and controls the power supply circuit module of said one of the transmitter/receiver/modem blocks such that power supplied to the transmitter circuit module by the power supply circuit module is lowered, and when the number of defective fans exceeds the predetermined value, the control unit outputs an alarm signal and starts the operation of the transmitter/receiver/modem block for the protection channel line.

* * * * *